(12) United States Patent
Petrucelli

(10) Patent No.: US 9,802,447 B2
(45) Date of Patent: *Oct. 31, 2017

(54) TIRE PRESSURE MONITORING SYSTEM

(71) Applicant: Measurement Ltd., Grand Cayman (KY)

(72) Inventor: Steven Petrucelli, Cranbury, NJ (US)

(73) Assignee: MEASUREMENT LTD., Grand Cayman (KY)

(*) Notice: Subject to any disclaimer, the term of this patent is extended or adjusted under 35 U.S.C. 154(b) by 216 days.

This patent is subject to a terminal disclaimer.

(21) Appl. No.: 14/530,239

(22) Filed: Oct. 31, 2014

(65) Prior Publication Data
US 2015/0054641 A1    Feb. 26, 2015

Related U.S. Application Data

(63) Continuation of application No. 12/915,399, filed on Oct. 29, 2010.
(Continued)

(51) Int. Cl.
*B60C 23/04* (2006.01)
*B60C 23/00* (2006.01)

(52) U.S. Cl.
CPC ........ *B60C 23/0433* (2013.01); *B60C 23/006* (2013.01); *B60C 23/0401* (2013.01);
(Continued)

(58) Field of Classification Search
CPC . B60C 23/006; B60C 23/009; B60C 23/0401; B60C 23/0408; B60C 23/0433;
(Continued)

(56) References Cited

U.S. PATENT DOCUMENTS

| 4,748,845 A | 6/1988 | Rocco et al. |
| 4,827,764 A | 5/1989 | Hwang |

(Continued)

FOREIGN PATENT DOCUMENTS

| DE | 19837550 A1 | 2/1999 |
| GB | 2169411 A | 7/1986 |
| WO | 9607568 | 3/1996 |

OTHER PUBLICATIONS

TireGard 13-315, Wireless Tire Pressure Monitoring System, User Guide, available for sale May 3, 2009.
(Continued)

*Primary Examiner* — Quan-Zhen Wang
*Assistant Examiner* — Stephen Burgdorf
(74) *Attorney, Agent, or Firm* — Howard IP Law Group, PC

(57) ABSTRACT

A tire pressure monitoring system includes a tire valve stem mounted tire pressure gauge and an externally powerable remote display unit. The pressure gauge includes a pressure sensor, a wake circuit, a processor, and a first radio frequency (RF) module. The remote display unit includes a second RF module and a display. The wake circuit is adapted to activate the processor periodically at a predetermined interval of time and causes the processor to receive an output signal from the pressure sensor. The output of the pressure sensor is indicative of a tire pressure detected by the pressure sensor. The remote display unit is adapted to display the measured tire pressure value without any user input.

9 Claims, 26 Drawing Sheets

Related U.S. Application Data

(60) Provisional application No. 61/256,789, filed on Oct. 30, 2009.

(52) U.S. Cl.
CPC ...... B60C 23/0408 (2013.01); B60C 23/0479 (2013.01); B60C 23/0496 (2013.01)

(58) Field of Classification Search
CPC ............ B60C 23/0479; B60C 23/0494; B60C 23/0496; G01L 17/00
USPC ..... 73/146.2, 146.3, 146.4, 146.8; 116/34 R; 340/442, 445, 447, 539.1; D10/86
See application file for complete search history.

(56) References Cited

U.S. PATENT DOCUMENTS

| | | | |
|---|---|---|---|
| 4,845,980 A | 7/1989 | Weng | |
| 4,890,090 A | 12/1989 | Ballyns | |
| 4,916,944 A | 4/1990 | Ho-Chuan | |
| 4,924,697 A | 5/1990 | Hunt et al. | |
| 4,975,679 A | 12/1990 | Ballyns | |
| 4,998,438 A | 3/1991 | Martin | |
| 5,033,296 A | 7/1991 | Huang | |
| 5,055,826 A | 10/1991 | Ballyns | |
| 5,117,684 A | 6/1992 | Hwang | |
| D366,845 S | 2/1996 | Handfield et al. | |
| D366,846 S | 2/1996 | Handfield et al. | |
| 5,629,873 A | 5/1997 | Mittal et al. | |
| 5,694,111 A | 12/1997 | Huang | |
| D390,140 S | 2/1998 | Germanton | |
| D395,835 S | 7/1998 | Okuyama et al. | |
| 5,815,072 A | 9/1998 | Yamanaka et al. | |
| D409,509 S | 5/1999 | Petrucelli et al. | |
| D409,931 S | 5/1999 | Petrucelli et al. | |
| D427,092 S | 6/2000 | Wu | |
| D427,093 S | 6/2000 | Wu | |
| D440,893 S | 4/2001 | Van Zeyl | |
| D440,894 S | 4/2001 | Van Zeyl | |
| D440,895 S | 4/2001 | Van Zeyl | |
| D441,674 S | 5/2001 | Van Zeyl | |
| D447,970 S | 9/2001 | Cappiello et al. | |
| D450,257 S | 11/2001 | Bressler et al. | |
| D455,361 S | 4/2002 | Super et al. | |
| D455,666 S | 4/2002 | Cappiello et al. | |
| D459,257 S | 6/2002 | Petrucelli | |
| D459,668 S | 7/2002 | Petrucelli | |
| D462,627 S | 9/2002 | Petrucelli | |
| 6,445,287 B1* | 9/2002 | Schofield ............ B60C 23/0401 340/442 | |
| 6,476,712 B1 | 11/2002 | Achterholt | |
| D469,706 S | 2/2003 | Huang | |
| D474,124 S | 5/2003 | Krieger et al. | |
| D488,082 S | 4/2004 | Durr et al. | |
| D491,480 S | 6/2004 | Huang et al. | |
| D492,608 S | 7/2004 | Fujioka | |
| D496,602 S | 9/2004 | Shipman | |
| D498,154 S | 11/2004 | Wang | |
| 6,817,235 B2 | 11/2004 | Sapir | |
| D501,146 S | 1/2005 | Durr et al. | |
| 6,838,983 B1 | 1/2005 | Wong | |
| D501,418 S | 2/2005 | Wang | |
| 6,868,718 B1* | 3/2005 | Hui ...... B60C 23/0408 340/384.1 | |
| D503,898 S | 4/2005 | Durr et al. | |
| D504,630 S | 5/2005 | Wang | |
| D505,088 S | 5/2005 | Durr et al. | |
| D505,871 S | 6/2005 | Little et al. | |
| D505,872 S | 6/2005 | Durr et al. | |
| D506,154 S | 6/2005 | Cowan et al. | |
| 7,013,722 B2 | 3/2006 | Little et al. | |
| 7,040,153 B2 | 5/2006 | Kroll et al. | |
| 7,088,226 B2 | 8/2006 | McClelland et al. | |
| 7,185,533 B2 | 3/2007 | Lee et al. | |
| 7,250,852 B1 | 7/2007 | Kell | |
| 7,362,218 B2 | 4/2008 | McCall et al. | |
| 7,383,724 B2 | 6/2008 | Petrucelli | |
| 7,509,849 B2 | 3/2009 | Rutherford et al. | |
| 7,667,583 B2 | 2/2010 | Petrucelli | |
| 7,737,835 B2 | 6/2010 | Kyllmann et al. | |
| 7,789,112 B1 | 9/2010 | Wise | |
| 7,941,257 B2 | 5/2011 | Cotton et al. | |
| 2001/0050611 A1* | 12/2001 | Achterholt ......... B60C 23/0408 340/442 | |
| 2003/0008692 A1 | 1/2003 | Phelan | |
| 2005/0103108 A1 | 5/2005 | Little et al. | |
| 2005/0138999 A1 | 6/2005 | Petrucelli | |
| 2005/0156720 A1* | 7/2005 | Ogawa ............... B60C 23/0408 340/442 | |
| 2005/0217360 A1* | 10/2005 | Yueh ...................... B60C 23/001 73/146 | |
| 2006/0208865 A1* | 9/2006 | Quach .................. B60C 23/007 340/447 | |
| 2007/0193349 A1 | 8/2007 | Petrucelli | |
| 2008/0284576 A1* | 11/2008 | Zhou ................... B60C 23/0408 340/442 | |
| 2008/0291006 A1* | 11/2008 | Kang .................... G08B 25/10 340/539.1 | |
| 2009/0021362 A1* | 1/2009 | Kochie ............... B60C 23/0408 340/442 | |
| 2009/0066496 A1 | 3/2009 | Nantz et al. | |
| 2009/0109012 A1 | 4/2009 | Petrucelli | |
| 2010/0019881 A1 | 1/2010 | Shimura | |

OTHER PUBLICATIONS

International Search Report dated Jan. 5, 2011 for related PCT Application No. PCT/US 10/54771.
Xchoppers Advertisement, dated Oct. 30, 2008.

\* cited by examiner

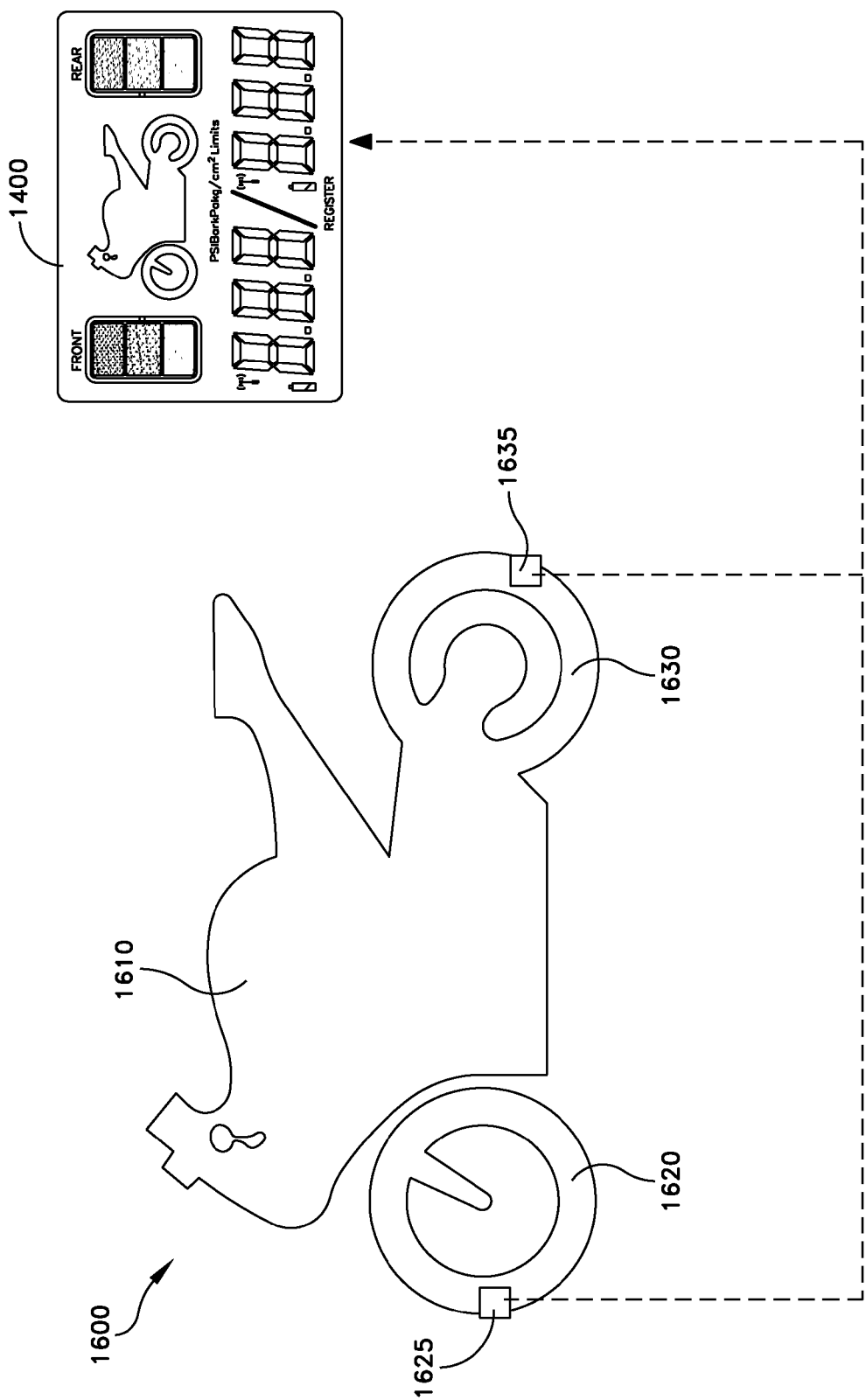

TIRE PRESSURE MONITORING SYSTEM

CROSS-REFERENCE TO RELATED APPLICATIONS

This application is a continuation of co-pending U.S. patent application Ser. No. 12/915,399 filed Oct. 29, 2010 entitled "TIRE PRESSURE MONITORING SYSTEM FOR MOTORCYCLES", which claims the benefit of U.S. Provisional Patent Application Ser. No. 61/256,789, filed Oct. 30, 2009, and entitled "TIRE PRESSURE MONITORING SYSTEM FOR MOTORCYCLES," which are hereby incorporated by reference in their entirety for all purposes.

FIELD OF INVENTION

The present invention relates to tire pressure measurement and tire pressure gauges.

BACKGROUND

Pressure gauges are conventionally used for measuring the pressure of a gas or a liquid, such as an air pressure. Tire pressure gauges, as an example, measure the inflation pressures of vehicle tires, such information being useful for maintaining optimal tire performance and avoiding unnecessary wear. Conventional tire pressure gauges are held in the hand, and require the user to locate a tire valve, unscrew a cap from the valve, and engage the tire pressure gauge with the valve. At night, it is difficult to locate the valve. Tire valve caps are usually covered in a film of dirt, which comes off on the user's fingers when removing and replacing the cap. While some vehicles have systems for monitoring of tire pressure using tire pressure gauges with radiofrequency transmitters installed in the tires, and systems for interrogating the gauges and receiving readings installed in the vehicle, such systems are not practical to install on existing tires and vehicles. Furthermore, such systems require user activation to measure and display or indicate the tire pressures. Alternative tire pressure measurement systems are, therefore, desirable.

SUMMARY OF THE INVENTION

A tire pressure monitoring system includes a tire valve-stem mounted tire pressure gauge and an externally powerable remote display unit. The pressure gauge includes a pressure sensor, a wake circuit, a processor, and a first radio frequency (RF) module. The remote display unit includes a second RF module and a display. The wake circuit is adapted to activate the processor periodically and to cause the processor to receive periodically an output signal from the pressure sensor indicative of a measured tire pressure. The remote display unit is adapted to display a value indicative of the tire pressure value measured by the pressure sensor without any user input. The tire pressure gauge and the remote display unit are adapted to be in wireless communication with each other via the first and second RF modules. The remote display unit may be powered through an AC adaptor.

In an embodiment of the invention, responsive to an activation signal from the wake circuit, the processor receives an output signal from the pressure sensor indicative of the measured tire pressure. The processor then compares the measured tire pressure value with the immediately previously measured tire pressure value stored in the memory. If the recently measured tire pressure value differs from the value stored in the memory by an amount more than a predetermined value, the processor causes the first RF module to transmit a wireless signal indicative of the recently measured tire pressure value. The wireless signal is received by the remote display unit via the second RF module. The remote display unit is adapted to display the most recent measured tire pressure value transmitted by the tire pressure gauge.

According to an embodiment of the invention, a tire pressure monitoring kit for a motorcycle includes a first and a second tire pressure gauge. Each of the tire pressures is configured to be mounted on a valve stem of a tire of the motorcycle and includes a pressure sensor, a processor, a wake circuit and a radio frequency module. The wake circuit is configured to activate the processor to receive an output of the pressure sensor periodically at a predetermined interval of time. The output is indicative of a tire pressure detected by the pressure sensor. The kit further includes a remote display unit including a second radio frequency module, a memory and a display. The second module is configured to wirelessly communicate with the radio frequency modules of the first and second tire pressure gauges.

According to embodiment of the invention, a method for monitoring tire pressure for a motorcycle includes the steps of mounting a tire pressure gauge on a valve stem of a tire of a motorcycle. A processor in the tire pressure gauge is periodically activated to receive an input from a pressure sensor in the tire pressure gauge, which input is indicative of a tire pressure detected by the pressure sensor. The processor causes a radio frequency module in the tire pressure gauge to emit a wireless signal which signal is indicative of a tire pressure detected by the pressure sensor. The wireless signal emitted by the radio frequency module is received at an externally powerable remote display unit. A graphical indictor representative of a value of the tire pressure detected by the pressure sensor is displayed in the remote display unit.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which:

FIG. 16 is a schematic diagram of a tire pressure monitoring system, according to an embodiment of the invention;

DETAILED DESCRIPTION

It is to be understood that the figures and descriptions of the present invention have been simplified to illustrate elements that are relevant for a clear understanding of the present invention, while eliminating, for purposes of clarity, many other elements found in typical tire pressure gauges and tire pressure measurement systems. However, because such elements are well known in the art, and because they do not facilitate a better understanding of the present invention, a discussion of such elements is not provided herein. The disclosure herein is directed to all such variations and modifications known to those skilled in the art.

Further, it should be understood that the several views of the housings, displays and general configurations shown in the figures include many decorative or ornamental features, aspects of which the particulars may be changed while maintaining the device's utility and without departing from the scope and spirit of the present invention.

Figure 1:
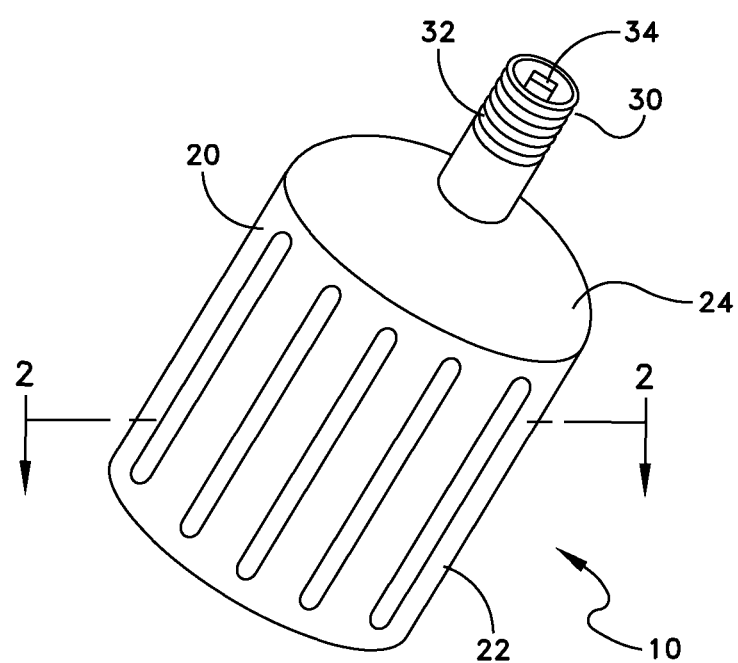
FIG. 1 is an isometric view of a tire pressure gauge, according to an embodiment of the present invention.

Referring to FIG. 1, tire pressure gauge 10 has a wall 20, which includes cylindrical sidewall 22 and planar top wall 24, as well as a planar bottom wall, not shown in FIG. 1. Wall 20 defines an interior chamber, described below. Port 30 in wall 20 is provided, and includes a passage which communicates with and opens into the interior chamber, which passage may be closed by a valve (not shown in FIG. 1), such as a bleeder or pin valve. Port 30 is adapted to be attached to a nozzle of a conventional air hose, and has a threaded cylindrical outer surface 32 adapted to mate with a correspondingly threaded boss in a nozzle of such an air hose. Port 30 has a central rod or needle or pin 34 which, when engaged, such as by a central pin in a nozzle of an air hose, opens a bleeder or pin valve associated with port 30.

Figure 2:
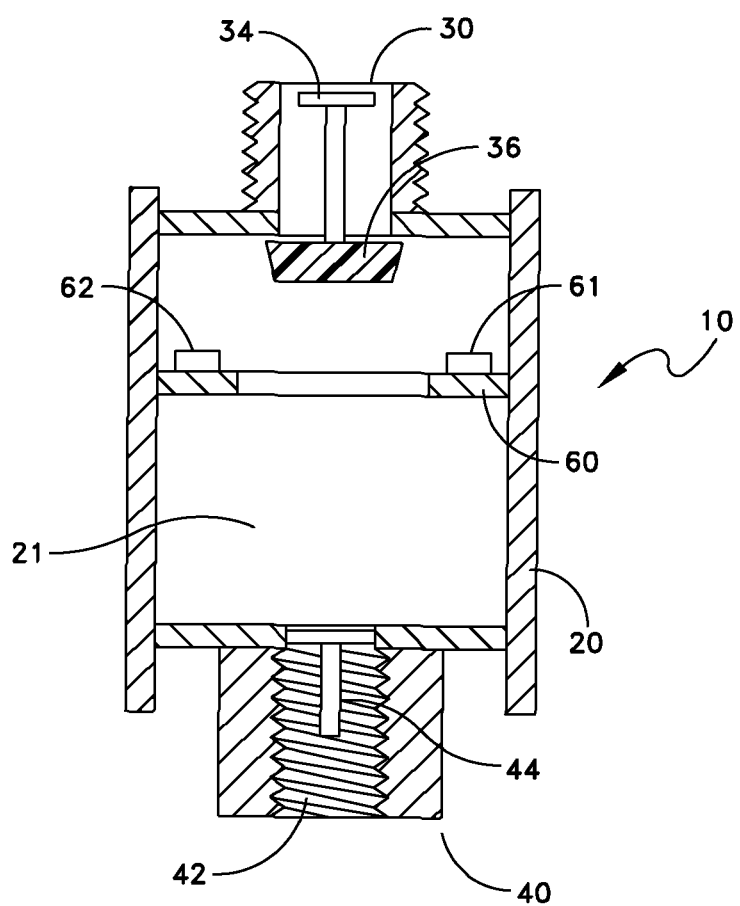
FIG. 2 is a cross-sectional view, along line 2-2 of FIG. 1, of the tire pressure gauge of FIG. 1.

Referring now to FIG. 2, there is shown a cross-sectional view, along line 2-2, of the tire pressure gauge 10 of FIG. 1. Chamber 21 defined within wall 20 can be seen. Chamber 21 has openings only at port 30 and port 40, and is otherwise sealed. At port 30, a valve is provided to selectively seal port 30. Port 40 is adapted to engage with and open the needle valve on a suitable tire valve stem. Port 40 is preferably adapted to engage with and open the needle valve on a conventional tire valve stem, so that the conventional tire valve stem requires no modification for installation of a device in accordance with an embodiment of the invention. A tire valve stem is typically in the form of a tube, threaded on the exterior near the end thereof, to permit attachment of a protective cap, and having a valve, referred to variously as a pin valve, bleeder valve, or Schrader valve. This type of valve is kept normally closed by a combination of air pressure and a spring urging a stopper into contact with an opening. A pin extending out of the valve may be urged inward, such as by a piston in a nozzle of a service station air hose, to open the valve to permit the introduction of pressurized air into the tire.

Port 40 has a threaded boss 42 adapted to sealingly engage with a threaded tire valve stem. Pin 44 within boss 42 is adapted to open a needle valve on a valve stem when port 40 is in engagement with a suitable valve stem. PCB 60 is interior to chamber 21 and has thereon devices indicated generally at 61, 62. Port 30 has a pin valve 34 including a stopper 36 that is normally closed by pressure within chamber 21, or may be spring loaded. Pin 34 is coupled to stopper 36 so that urging of pin 34 toward chamber 21 causes stopper 36 to disengage and permit air to move between chamber 21 and the interior of port 30. Thus, with gauge 10 affixed to a valve stem of a tire, the tire may be pressurized by engaging the nozzle of a service station air hose with port 30.

Figure 3:
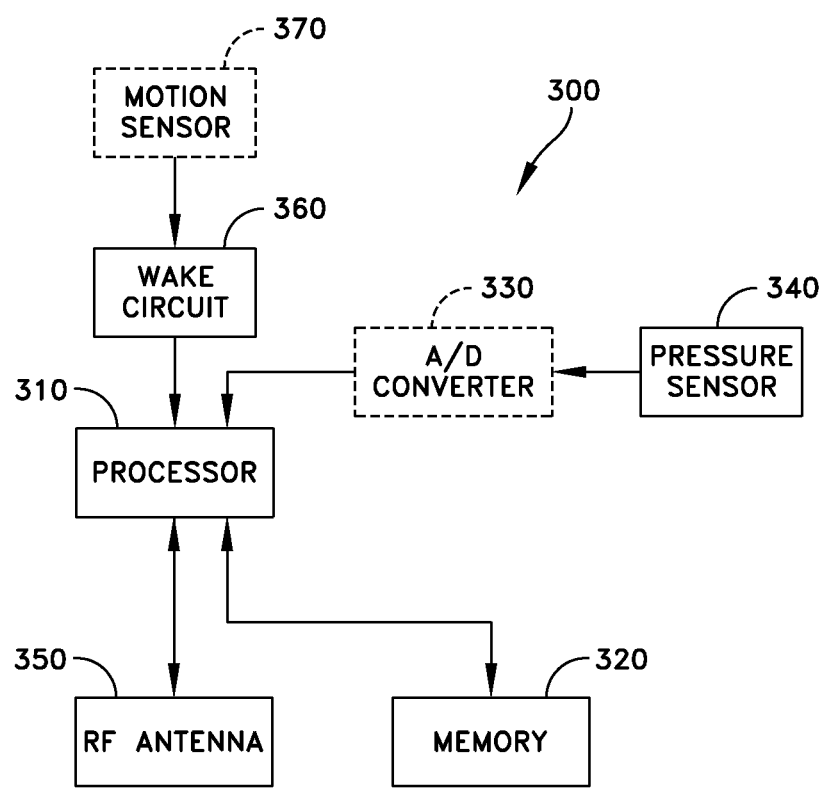
FIG. 3 is a block diagram of components of the tire pressure gauge of FIG. 1.

As set forth above, gauge 10 includes a pressure sensor located within wall 20 defining chamber 21. Referring now also to FIG. 3, there is shown a block diagram of an arrangement 300 suitable for use within chamber 21 of FIGS. 1 and 2. An exemplary arrangement 300 generally includes a processor 310, a memory 320 accessible to processor 310, optional analog to digital converter 330, pressure sensor 340, a radio frequency (RF) module or antenna 350, a wake circuit 360, and an optional motion sensor 370.

"Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

Processor 310 may take the form of a microprocessor, and may be a low power CMOS processor with an embedded analog to digital converter, by way of non-limiting example only. The present invention is operable with computer storage products or computer readable media that contain program code for performing the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter.

Processor 310 may include multiple inputs and outputs. In the exemplary configuration illustrated in FIG. 3, processor 310 has an input coupled to wake circuit 360. Processor 310 may also be coupled to memory 320 to allow it to access its data contents. Processor 310 may have an input coupled to pressure sensor 340 optionally via analog-to-digital converter (A/D) 330. For example, where pressure sensor 340 provides an analog output signal indicative of a pressure sensed using port 30, A/D converter 330 may communicate a digital signal indicative of the analog signal output from pressure sensor 340 to processor 310. Where pressure sensor 340 provides a digital signal directly, A/D converter 330 may optionally be omitted. Also, where processor 310 is adapted to receive analog signals output from pressure sensor 340 directly, A/D converter 330 may optionally be omitted. A/D converter 330 may be selected based upon size limitations of chamber 21, an expected output from pressure sensor 340, accepted input for processor 310 and available power sources (not shown) for pressure gauge 10 (such as one or more batteries contained within chamber 21), for example.

Memory 320 may be internal or external to processor 310 and may take the form of one or more random-access memory (RAM), read-only memory (ROM), programmable read-only memory (PROM), erasable programmable read-only memory (EPROM), or electrically erasable programmable read-only memory (EEPROM) chips, by way of non-limiting example only.

Pressure sensor 340 may be any one of a number of conventional sensors for detecting fluid pressure, and particularly air pressure, and selected to provide acceptable response over a range of pressures anticipated in a particular application. By way of example, pressure sensor 340 may incorporate a MEMS based pressure die.

RF module or antenna 350 is in communication with processor 310 and is adapted to receive and transmit RF signals and includes electrical circuit elements for receiving and transmitting RF signals, responsive to activation signals from processor 310.

Figure 4A:
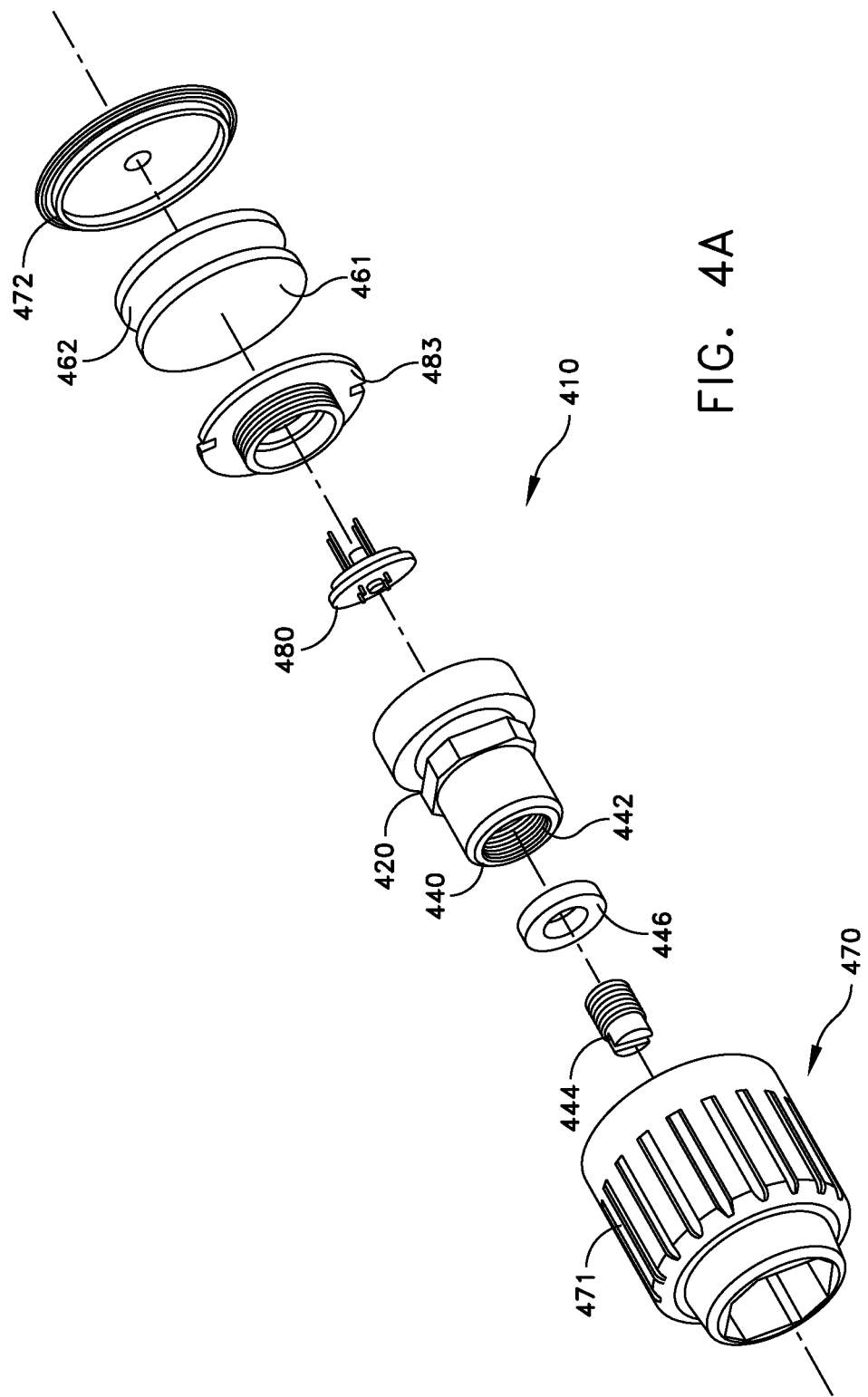
FIG. 4A is an exploded view of a tire pressure gauge in accordance with an alternative embodiment of the invention.
Figure 4B:
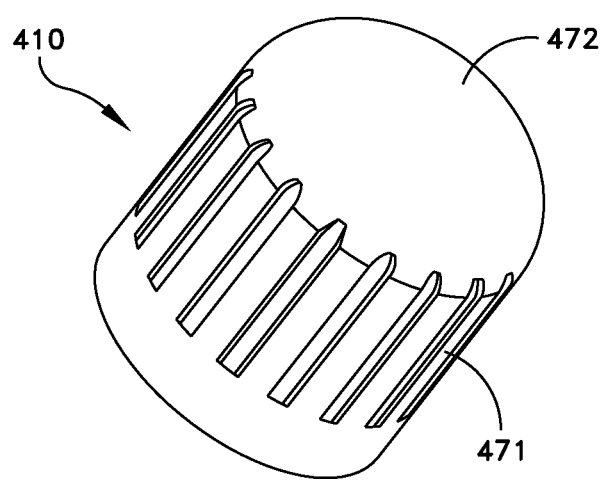
FIG. 4B is a view of the tire pressure gauge of FIG. 4A, as assembled.

FIG. 4A is an exploded view of a tire pressure gauge 410, according to another embodiment of the invention, and FIG. 4B is a view of tire pressure gauge 410 when assembled. Tire pressure gauge 410 has a single port for receiving pressurized air from a tire valve stem, but does not have an additional port for receiving pressurized air. Tire pressure gauge 410 may include a device for receiving power wirelessly. By way of example, tire pressure gauge 410 may include one or more radio frequency antennas, such as those used in radiofrequency identification tags (RFIDs). When interrogated by a source of RF radiation at the proper frequency, such an antenna generates a current which may be used variously, directly by a processor and display for power, or to a battery or capacitor for storage and discharge of current to power a processor and display. A user may have a handheld or a remote unit that serves as a source of RF radiation at the proper frequency.

Outer housing 470 may be substantially cylindrical, and have two pieces, namely a body portion 471 open at both ends and a cap 472 that closes a distal opening of body portion 471.

Inner housing 420 defines a chamber having an opening, when the tire gauge is fully assembled, only at port 440, and is otherwise sealed. Port 440 is adapted to engage with and open the needle valve on a suitable tire valve stem. Port 440 has a threaded boss 442 adapted to sealingly engage with a threaded tire valve stem. Piston 444 within boss 442 is adapted to open a needle valve on a valve stem when port 440 is in sealing engagement with a suitable valve stem. PCBs 461, 462 are mounted exterior to the chamber and within outer housing 470, and may carry thereon devices such as an RF antenna, battery, capacitor, processor, and wake up circuit. A pressure sensing die 480 is positioned at an end of the chamber and bolt 483, and seals the corresponding opening in inner housing 420.

Figure 5:
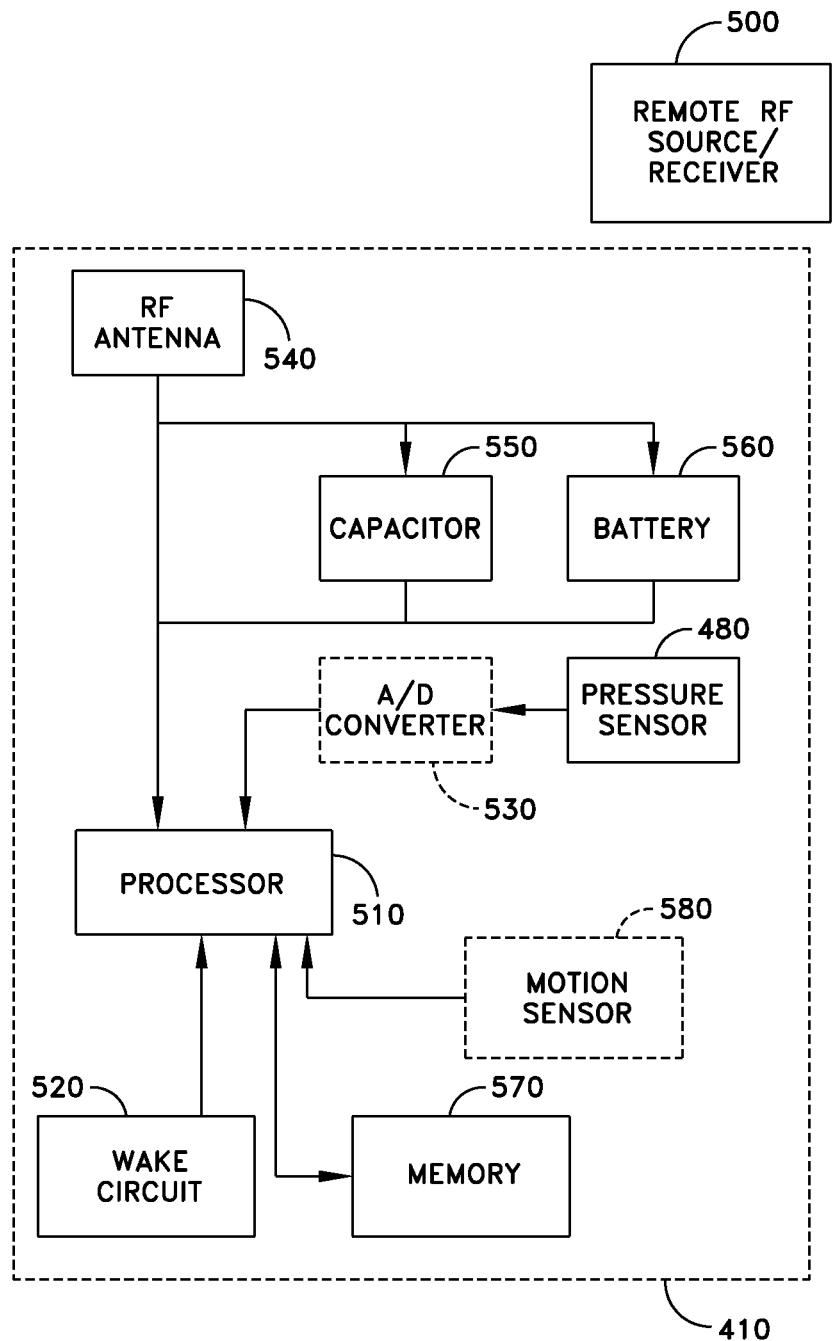
FIG. 5 is a block diagram of components in a tire pressure gauge in accordance with the embodiment of FIG. 4A together with an RF source.

Referring now to FIG. 5, a block diagram of tire gauge 410, in a system together with a remote RF source/receiver 500, is illustrated. Tire gauge 410 may include a processor 510, an RF antenna 540, a power source 560, such as a battery, a wake circuit 520, a pressure sensor 480, a memory 570, and an optional motion sensor 580. In use, the user places the handheld or remote RF source/receiver 500 in proximity to gauge 410, according to an embodiment of the invention. The distance between handheld or remote RF source/receiver and tire pressure gauge 410 at which pressure gauge 410 will operate may be, in some embodiments, at least about three to four feet, so that a user may stand next to the vehicle, holding the handheld or remote RF source/receiver 500 in the hand, and activate gauge 410 by activating handheld or remote RF source/receiver 500, without the need to stoop or lean to bring handheld or remote RF source/receiver closer than three or four feet from pressure gauge 410. The distance may be greater in some embodiments, by way of example, sufficiently long that an activating device may be located in a dashboard of the vehicle or mounted on a wall in the garage. When RF radiation from remote RF source/receiver 500 is received by RF antenna 540, a current is produced by RF antenna 540. The current may be provided directly to processor 510, or to a capacitor 550 which then supplies a current to processor 510, or to battery 560, which then supplies a current to processor 510. It will be understood that a suitable voltage is also furnished to pressure sensor 480, and optional A/D converter 530.

Memory 570 may be internal or external to processor 510 and may take the form of one or more random-access memory (RAM), read-only memory (ROM), programmable read-only memory (PROM), erasable programmable read-only memory (EPROM), or electrically erasable programmable read-only memory (EEPROM) chips, by way of non-limiting example only.

In an exemplary embodiment, wake circuit 520 is adapted to activate processor 510, which, in turn, causes pressure sensor 480 to measure the tire pressure. In this configuration, a user is not required to activate remote RF source/receiver 500; rather, wake circuit 520 periodically activates processor 510 after a predetermined interval of time, independent of any received signal or any motion detected by motion sensor 580. By way of non-limiting example only, wake circuit 520 may be adapted to activate processor 510 every thirty (30) seconds to cause pressure sensor 480 to measure the tire pressure. It will be appreciated that the predetermined interval of time may be adjusted to be more than or less than thirty (30) seconds. In an exemplary embodiment, each measurement includes measuring the tire pressure three (3) times. In other embodiments, each measurement may include measuring the tire pressure for more than or less than three (3) times. Processor 510 causes a transmission of RF signal indicative of the measured tire pressure value via RF antenna 540, which RF signal may be received by remote RF source/receiver 500. In one configuration, wake circuit 520 is adapted to activate processor 510 when battery 560 is first installed in pressure gauge 410 by a user. Wake circuit 520 continues to periodically activate processor 510 after a predetermined interval of time so long as battery 560 provides sufficient power to wake circuit 520 and other components of pressure gauge 410. Additionally, wake circuit 560 may also be configured to activate processor 510, responsive to a wireless signal received from a remote command device 500 (of FIG. 5). In an exemplary embodiment, motion sensor 370 is adapted to provide an output signal, responsive to detection of motion, which signal, upon receipt by processor 510, causes processor 510 to become activated.

In an exemplary configuration, battery power may be conserved by regulating the number of times and the conditions under which pressure gauge 410 transmits the measured tire pressure to remote RF source/receiver 500. By way of non-limiting example, after every measurement, processor 510 compares the measured pressure with the value of the previous measured pressure stored in memory 570. Tire pressure gauge 410 may transmit the value of the measured pressure only if the most recent measured tire pressure value differs from the previously measured tire pressure by a predetermined value. In an exemplary embodiment, pressure gauge 410 may transmit the value of the recently measured pressure only if the most recent measured tire pressure value differs from the previously measured tire pressured by one (1) pound per square inch (psi). Thus, power is expended to transmit a wireless signal only if the most recent measured tire pressure value differs from the previously measured tire pressure by a predetermined value. After the comparison and/or the transmission, processor 510 and the associated circuitry "sleeps" for a predetermined period of time before being activated again by wake circuit 520.

Figure 6:
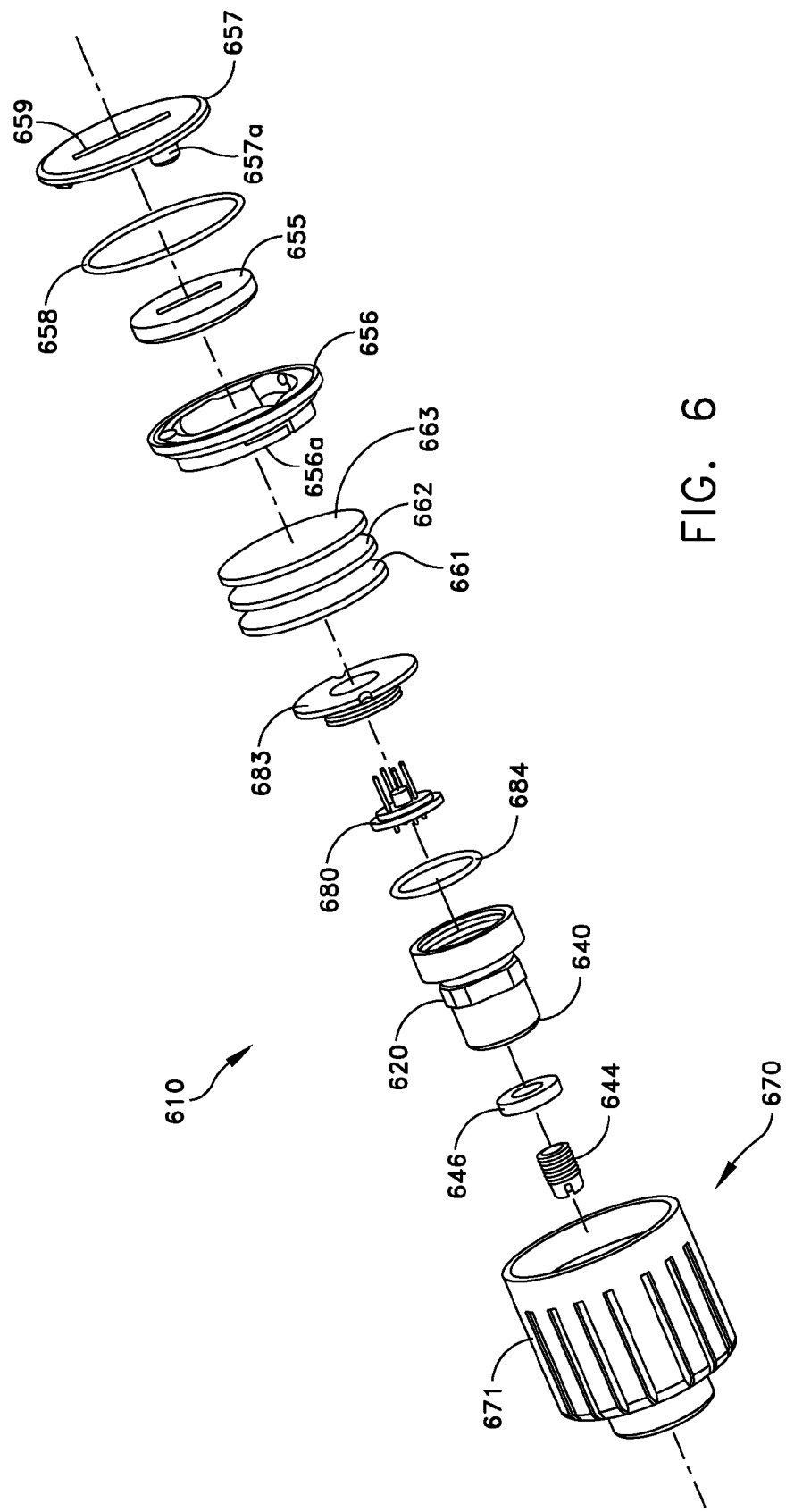
FIG. 6 is an exploded view of a tire pressure gauge in accordance with an alternative embodiment of the invention.

Referring now to FIG. 6, tire pressure gauge 610 is depicted in an exploded view. Tire pressure gauge 610 has as a power source battery 655 adapted to be removed and replaced easily. In particular, tire pressure gauge 610 includes a battery compartment 656 having a lid 657 which may be removed and replaced readily, and particularly by rotating. Lid 657 is generally a solid cylinder, and has a latch at 657a, which mates with a protrusion at 656a. By placing a flat object, such as a coin or screwdriver blade, into slot 659 in lid 657, the user may turn lid 657 sufficiently to disengage latch 657a from protrusion 656a, and thereby remove lid 657 and remove and replace battery 655. O-ring 658 may be provided to prevent moisture from entering the interior of battery compartment 656. Outer housing 670 may be substantially cylindrical, and have two pieces, namely a body portion 671 open at both ends and battery compartment 656 that closes a distal opening of body portion 671.

Inner housing 620 defines a chamber having an opening, when the tire gauge is fully assembled, only at port 640, and is otherwise sealed. Port 640 is adapted to engage with and open the needle valve on a suitable tire valve stem. Port 640 has a threaded boss (not shown) adapted to sealingly engage with a threaded tire valve stem. Piston 644 fits within the threaded boss and is adapted to open a needle valve on a valve stem when port 640 is in sealing engagement with a suitable valve stem. Washer 646 may be provided to assist in sealing port 640 to a valve stem. PCBs 661, 662, 663 are mounted exterior to the chamber and within outer housing 670, and may carry thereon devices such as an RF antenna and other components such as wake up circuit components, processor and memory. A pressure sensing die 680 is positioned at an end of the chamber, and bolt 683, with washer 684, seals the corresponding opening in inner housing 620. An advantage of the embodiment of FIG. 6 is that it may provide the device with a relatively significant power source, without the need to damage any permanent components to replace a battery.

Figure 7:
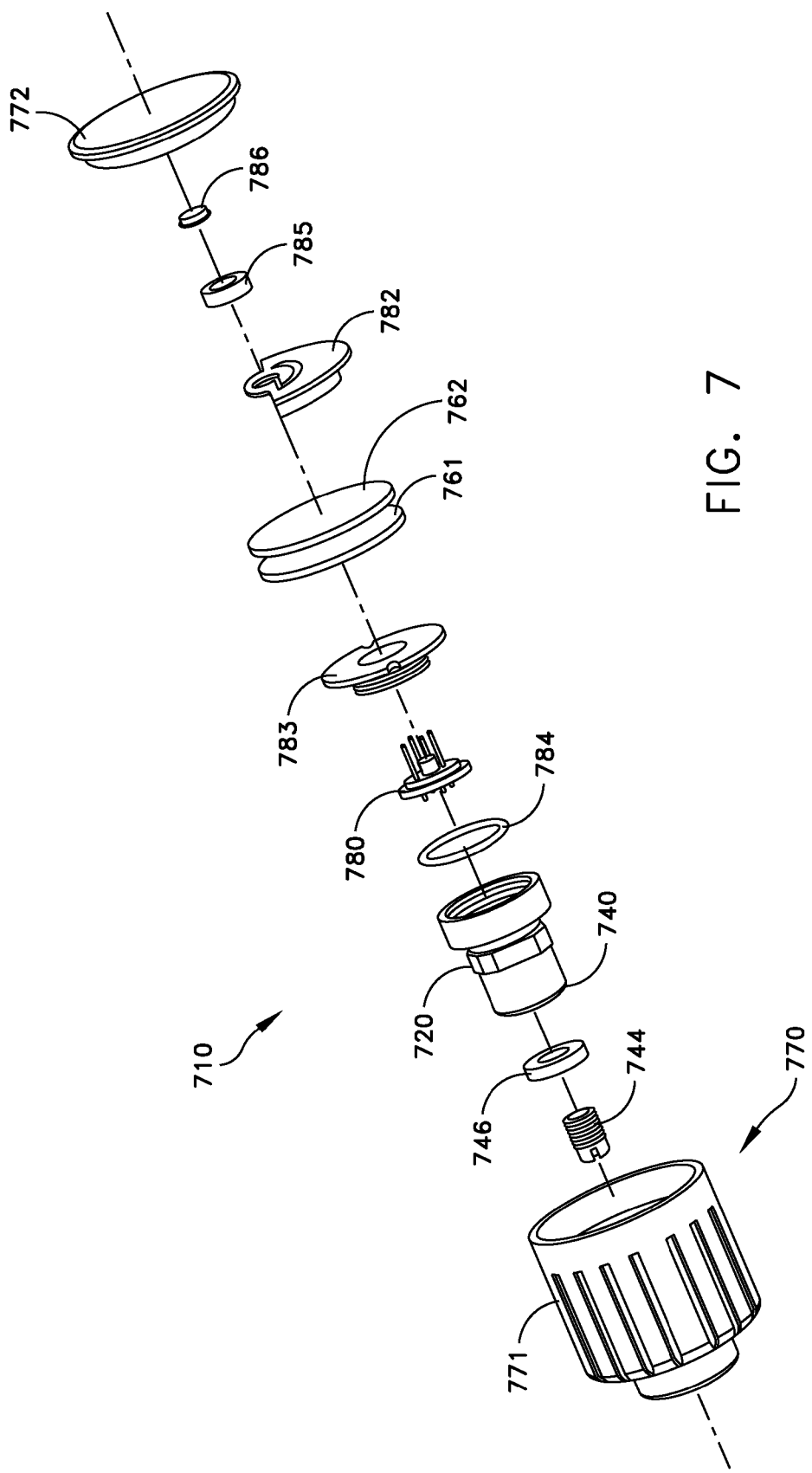
FIG. 7 is an exploded view of a tire pressure gauge in accordance with another alternative embodiment of the invention.

Referring now to FIG. 7, there is shown an exploded view of a tire pressure gauge 710 in accordance with an embodiment of the invention, in which relative internal motion of components as a result of motion of the device as the tire to which it is attached spins, is stored for later use, such as by being converted to a current and coupled to a battery or capacitor. It will be appreciated that devices that obtain energy from relative motion of internal components caused by motion of the device itself, are well-known. Self-winding watches store energy in this manner, by way of example, by use of an eccentric rotor coupled to a ratchet; motion of the ratchet winds a spring. Techniques applicable to self-winding watches may be applied to a tire pressure gauge in accordance with alternative embodiments of the invention. However, in the embodiment of FIG. 7, an eccentric wheel 782 oscillates relative to the housing and other components. The depicted form of eccentric wheel 782 is merely exemplary, and, by way of example, other wheels or objects with unbalanced weight and mounted to rotate, may be employed. Eccentric wheel 782 is rotatable on a mount (not shown). Bearing parts 785, 786 serve to cause eccentric wheel 782 to rotate in a plane with minimal friction. Eccentric wheel 782 has one or more permanent magnets (not shown) mounted thereon. One or more coils (not shown) may be mounted on PCB 762. A current is generated in the one or more coils when the one or more permanent magnets move, and the current may be employed to recharge one or more rechargeable batteries or capacitors (not shown), which may be mounted, by way of example, on one or more of PCBs 761, 762, or an inner surface of housing 770. Alternatively, eccentric wheel 782 may be coupled to a piece of piezo film, which, when is subject to stresses and/or strains as a result of the movement of eccentric wheel 782, provides a current to one or more rechargeable batteries or capacitors. Outer housing 770 may be substantially cylindrical, and have two pieces, namely a body portion 771, open at both ends, and lid 772, which also supports eccentric wheel 782.

Inner housing 720 defines a chamber having an opening, when the tire gauge is fully assembled, only at port 740, and is otherwise sealed. Port 740 is adapted to engage with and open the needle valve on a suitable tire valve stem. Port 740 has a threaded boss (not shown) adapted to sealingly engage with a threaded tire valve stem. Piston 744 fits within the threaded boss and is adapted to open a needle valve on a valve stem when port 740 is in sealing engagement with a suitable valve stem. Washer 746 may be provided to assist in sealing port 740 to a valve stem. PCBs 761, 762 are mounted exterior to the chamber and within outer housing 770, and may carry thereon devices such as an RF antenna and other components such as wake up circuit components, processor, memory, battery, motion sensor (not shown) and/or capacitor. A pressure sensing die 780 is positioned at an end of the chamber, and bolt 783, with washer 784, seals the corresponding opening in inner housing 720. An advantage of the embodiment of FIG. 7 is that it may provide the device with an internal source of power.

Figure 8:
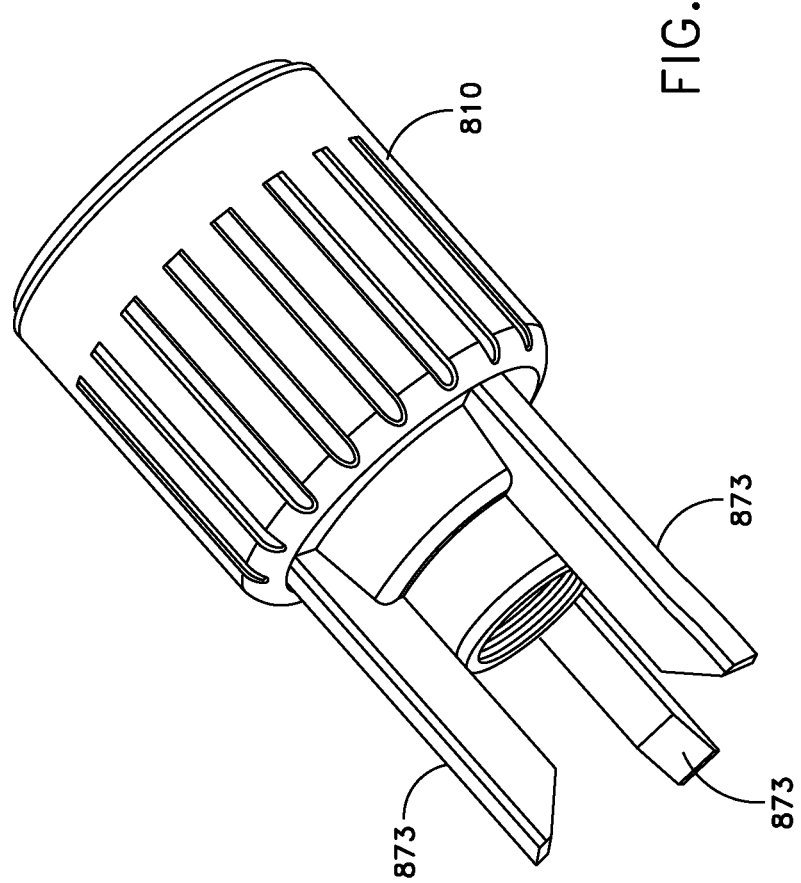
FIG. 8 is a view of an alternative embodiment of a tire pressure gauge outer housing.

Referring now to FIG. 8, an alternative embodiment of a cap is shown. Cap 870 has at least one extension that is adapted to engage substantially opposing sides of a valve cap. In the illustrated embodiment, a plurality of fingers 873 extend from cap 870 and are adapted to engage the sides of a valve stem when the device is engaged with a valve stem. Fingers 873 preferably are adapted to engage sides of a valve stem under tension. Fingers 873 serve to provide additional stability to a tire pressure gauge in accordance with an embodiment of the invention. While three fingers 873 are shown, the fingers may take any desired shape, and any form of extension that provides tension on substantially opposite sides of cap 870 would assist in stabilizing the device. It will be appreciated that one or more of fingers 873 may be hollow and enclose components of a tire pressure gauge.

Figure 9:
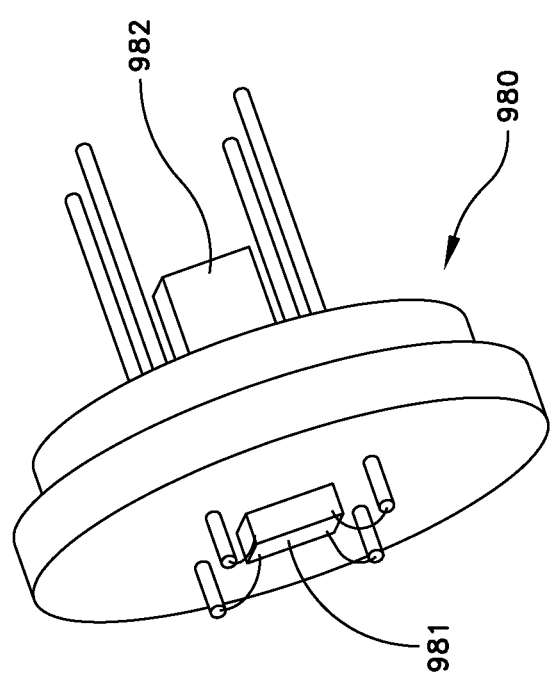
FIG. 9 is a view of an alternative embodiment of a pressure module in accordance with an embodiment of the invention.

Referring now to FIG. 9, there is shown an alternative embodiment of a pressure sensing module 980, with an additional sensor, which may either be a pressure sensing die or a temperature sensor, provided. In this embodiment, module 980 has a pressure sensing die 981 on the side facing an interior chamber, so that pressure sensing die 981 provides a signal indicative of a pressure in the chamber. On the opposite side of module 980 a second pressure sensing die 982 is provided. Pressure sensing die 982 may be employed to obtain a relative pressure. Temperature readings may also be obtained. Alternatively, a single die with multiple sensors may be provided. Multiple sensor dies may be provided for the purpose of offset compensation, as will be appreciated by those of skill in the art.

Figure 10:
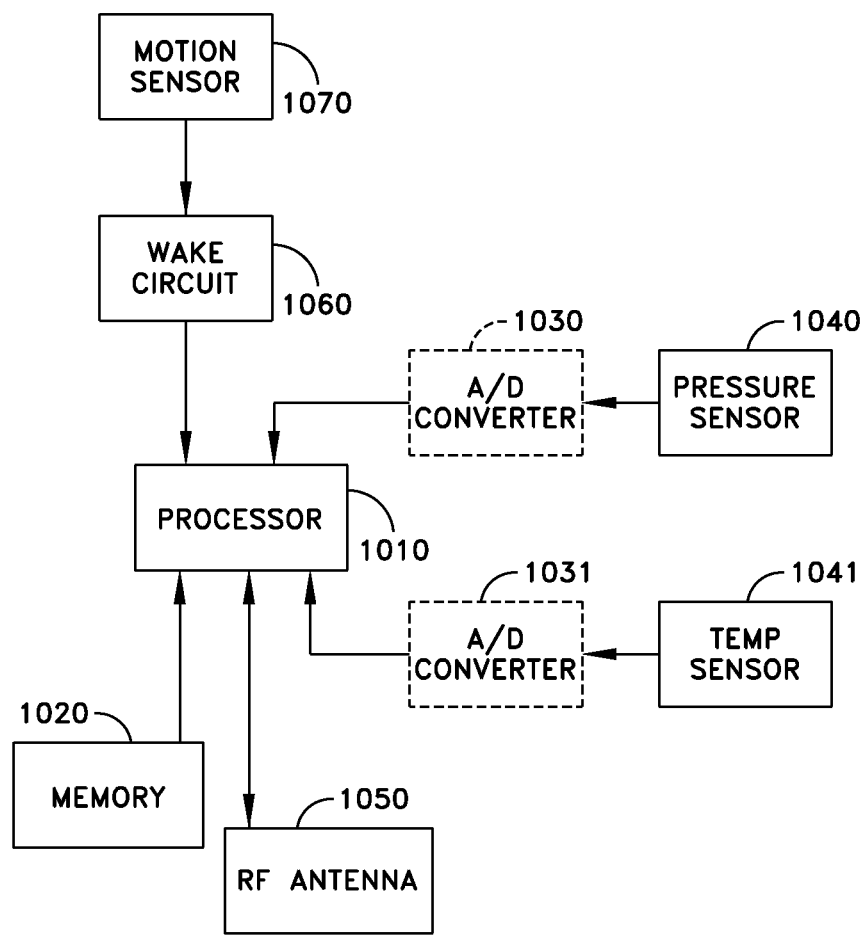
FIG. 10 is a block diagram of an alternative embodiment of a tire pressure gauge.

Referring now to FIG. 10, there is shown a block diagram of an embodiment of a tire pressure gauge having a pressure sensor and a temperature sensor. Processor 1010, memory 1020, RF antenna 1050, wake circuit 1060, pressure sensor 1040, optional A/D converter 1030, and optional motion sensor 1070 may be the same as those discussed above in connection with FIG. 3. Temperature sensor 1041 provides an output signal indicative of a temperature of the air in the chamber, and thus indicative of the air temperature in the tire. Temperature sensor outputs its signal to optional A/D converter 1031, which provides the digitized signal to processor 1010.

Figure 11:
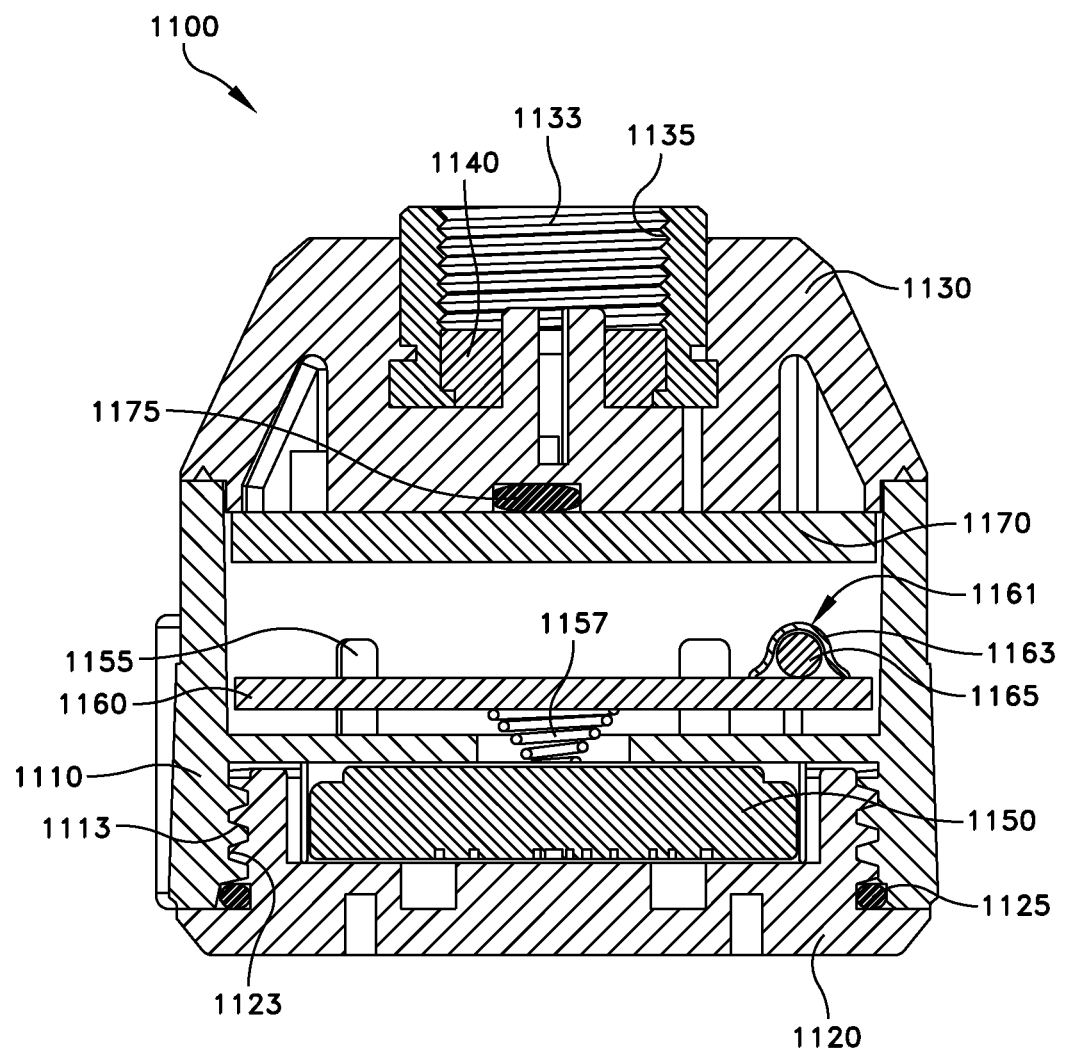
FIG. 11 is a cross-sectional view of a tire pressure gauge, according to yet another embodiment of the invention.

Referring now to FIG. 11, a cross-sectional view of a tire pressure gauge 1100 is illustrated, according to an embodiment of the invention. Pressure gauge 1100 includes a bottom housing 1110, a top housing 1130 and a battery lid or cover 1120. A battery 1150 is housed in battery lid 1120. In an exemplary embodiment, battery lid 1120 includes external threads 1123 adapted to engage internal threads 1113 of bottom housing 1110. Battery lid 1120, thus, may be relatively easily disengaged from bottom housing 1110 to replace battery 1150. An O-ring 1125 seals the interface between battery cover 1120 and bottom housing 1110, thereby reducing the likelihood of moisture entering the interior of pressure gauge 1100. Bottom housing 1110 further includes positive battery contact 1155 and negative battery contact 1157 for connecting battery 1150 to a controller PCB 1160. Controller PCB 1160 may include a processor (e.g., processor 510 of FIG. 5), a wake circuit (e.g., wake circuit 520 of FIG. 5), a memory (e.g., memory 570 of FIG. 5) and other circuit elements. Controller PCB 1160 further includes a motion sensor 1161 in the form of a motion switch dome 1163 and a motion switch ball 1165, in an exemplary embodiment. It will be understood that motion sensor 1161 may include other types of motion sensors and accelerometers as are known in the art. Motion sensor 1161 may be employed to activate the processor (e.g., processor 510 of FIG. 5) to receive an output signal from the pressure sensor (e.g., pressure sensor 480 of FIG. 5).

Figure 12:
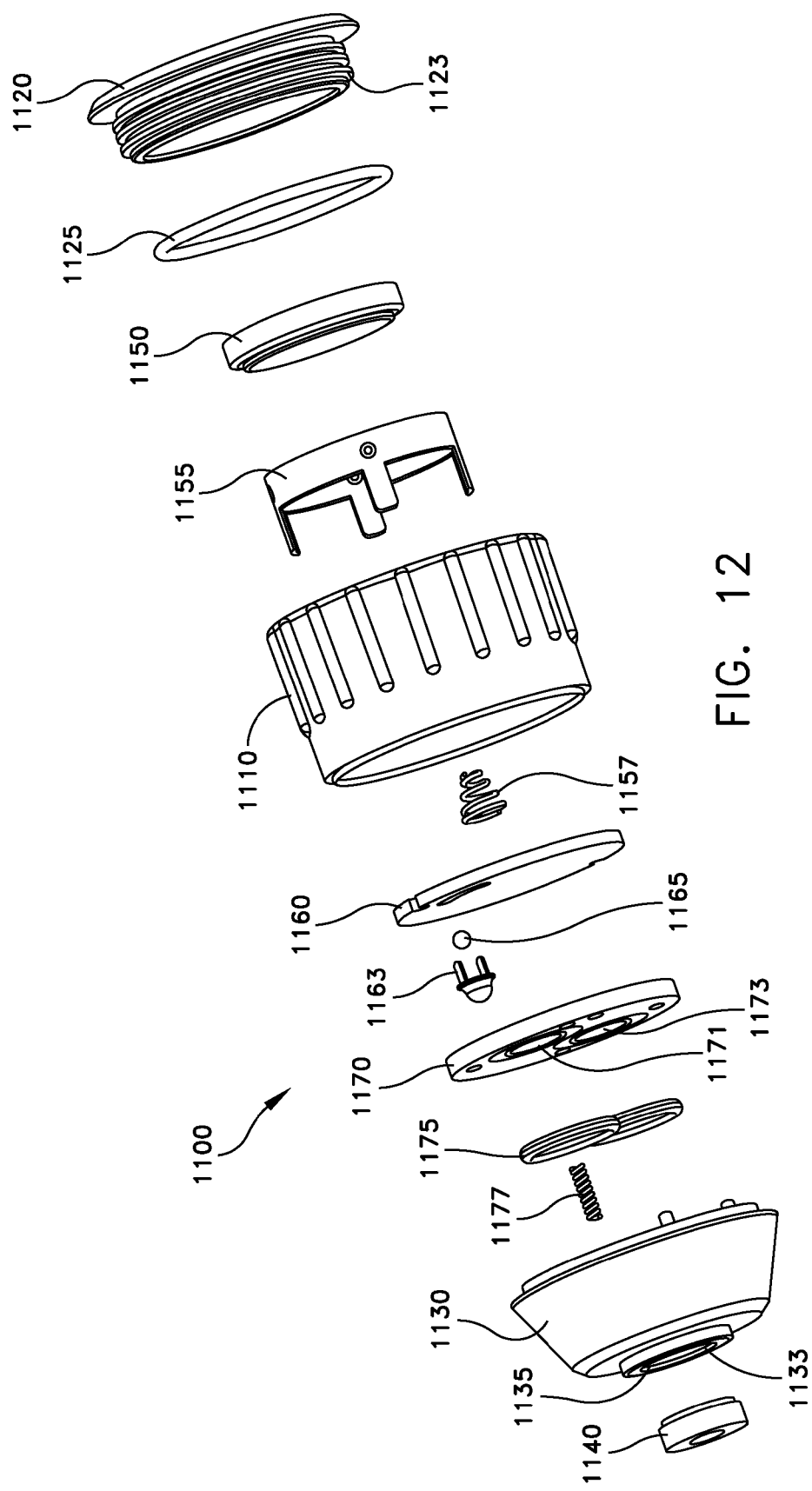
FIG. 12 is an exploded view of the tire pressure gauge of FIG. 11.

Now also referring to FIG. 12, which illustrates an exploded view of pressure gauge 1100 of FIG. 11, a sensor PCB 1170 is in electrical communication with controller PCB 1160. In one configuration, sensor PCB 1170 includes first and second pressure sensors 1171, 1173 and circuit elements for an RF transmitter, which elements are not described in further detail for the sake of brevity. In an exemplary embodiment, first and second sensors 1171, 1173 may respectively be adapted to sense the tire pressure and the atmospheric pressure, as set forth herein. An antenna coil spring contact 1177 is in electrical communication with sensor PCB 1170 and associated RF transmitter circuit elements. A top housing 1130 is fastened to bottom housing 1110. Top housing 1130 includes a port 1133 having internal threads 1135. Port 1133 is adapted to accommodate and to be mounted on a valve stem of a tire via internal threads 1135. Pressure gauge 1100 further includes a pin (not shown) to open a valve mounted in the valve stem of a tire.

Figure 13:
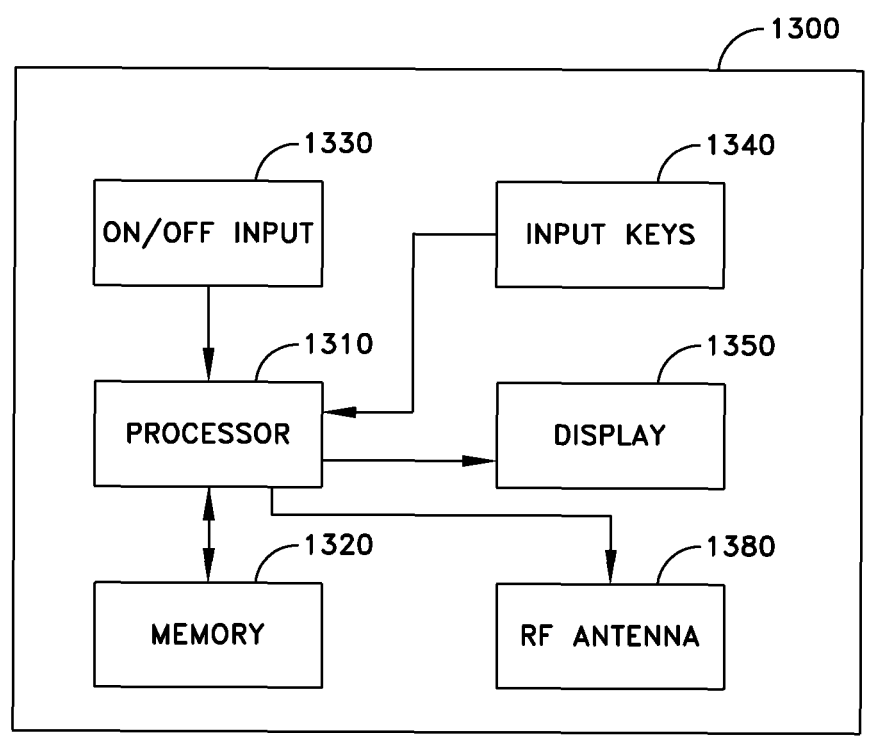
FIG. 13 is a block diagram of a remote control unit according to an embodiment of the invention.

Referring now to FIG. 13, there is shown a block diagram of a remote command or display device 1300, which may be employed with a tire pressure gauge described herein to cause a value to be displayed by, for example, display 1350, and to store new threshold values in, for example, memory 1320. Remote command device 1300 has a processor 1310, which may be, by way of non-limiting example, a microprocessor. Memory 1320 of remote command device 1300 may be internal or external to processor 1310 and may take the form of one or more random-access memory (RAM), read-only memory (ROM), programmable read-only memory (PROM), erasable programmable read-only memory (EPROM), or electrically erasable programmable read-only memory (EEPROM) chips, by way of non-limiting example only. An on/off input 1330 may include a user-operable on/off switch and a circuit to provide a wake signal to processor 1310 when a user operates the on/off switch to activate device 1300. Input keys 1340 are user-operable and provide inputs to processor 1310. By way of non-limiting example, input keys 1340 may include "up" and "down" keys for scrolling through menus, a "select" key for selecting a displayed and highlighted or otherwise designated menu item, and a "Reset" key. Alphanumeric display 1350 may include text, numbers and/or graphical symbols, and may be, by way of example, an LCD display, with or without lighting. RF Antenna 1380 may be a radiofrequency transmitter/receiver that can transmit and receive data, or may use another form of wireless transmission.

Remote command device 1300 may be a handheld device contained in a housing convenient to hold in the hand, and having an internal source of power, such as an internal battery, according to an embodiment of the invention. In another configuration, by way of non-limiting example only, remote command device 1300 may be adapted to be mounted on a wall. In an exemplary configuration, remote command device 1300 is externally powerable; by way of non-limiting example only, device 1300 may be powered externally through an AC adaptor or an external battery such as a 12 Volt automobile battery. Such externally powerable remote command 1300 is, therefore, operative, independent of the operational state of the vehicle whose tire pressure is being monitored. Thus, externally powerable remote command device 1300 is configured to be powered from a source external to device 1300 as well as external to the vehicle whose tire pressure is being monitored. Non-limiting examples of externally powerable command device 1300 include device 1300 powered through an AC power outlet via an AC adapter, device 1300 powered through an automotive battery not installed in a vehicle or a marine battery such as a 12 V battery, and device 1300 powered through any power source other than a battery internal to device 1300 or a battery disposed in the vehicle whose tire pressure is being monitored. Of course, display 1300 may, in addition, be configured to be powered by the vehicle battery or an internal battery, such as a back-up battery or a rechargeable battery recharged via a source of AC power. In another embodiment, remote command device 1300 may also be configured to be powered through a cigar lighter power receptacle of a motorcycle. Remote command device 1300 may also have an illumination source, such as a "white" LED, or an incandescent lamp with reflector, to provide illumination.

Figure 14:
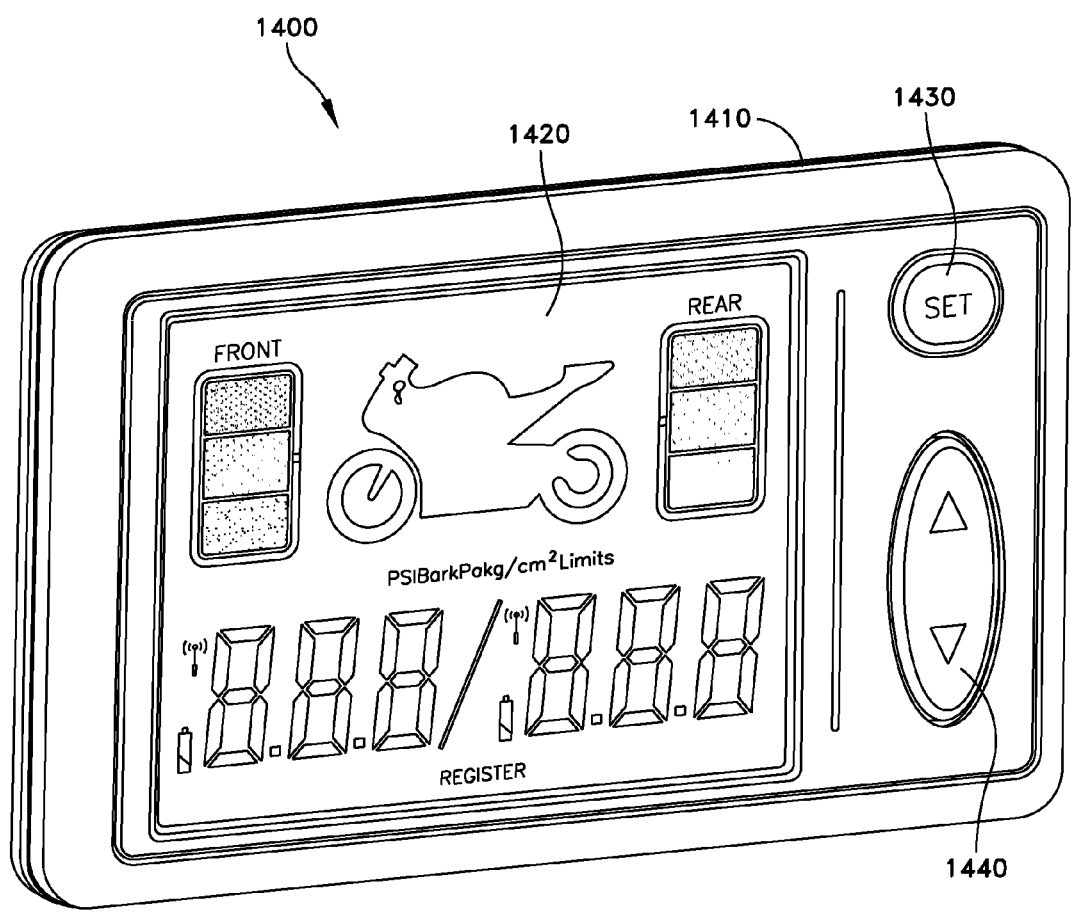
FIG. 14 is a remote display unit of a tire pressure monitoring system, according to an embodiment of the invention.

Referring now to FIG. 14, there is shown a remote display unit 1400 for a tire pressure measurement system, according to an embodiment of the invention. In the illustrated embodiment, display unit 1400 includes a housing 1410, a display 1420, and first and second user input buttons 1430, 1440. In an exemplary embodiment, display 1420 may take the form of Liquid Crystal Display (LCD). Other embodiments may include other types of displays. Yet other embodiments may include a combination of different types of displays. By way of non-limiting example only, display 1420 may take the form of LCD as well as one or more light emitting diodes (LEDs). In an exemplary embodiment, button 1430 is "SET" button, and button 1440 is a toggle button for "UP" and "DOWN." It will be appreciated that other embodiments of display unit 1400 may have more than or fewer than two buttons. It will be appreciated that other arrangements and functions of buttons are also contemplated to be within the scope of the invention. In an exemplary embodiment, display unit 1400 further includes a hidden "RESET" button (not shown) at the back of housing 1410. In one configuration, display unit 1400 is adapted to be mounted on a wall, by way of non-limiting example. In an exemplary embodiment, display unit 1400 may be powered by an AC adaptor.

Figure 15:
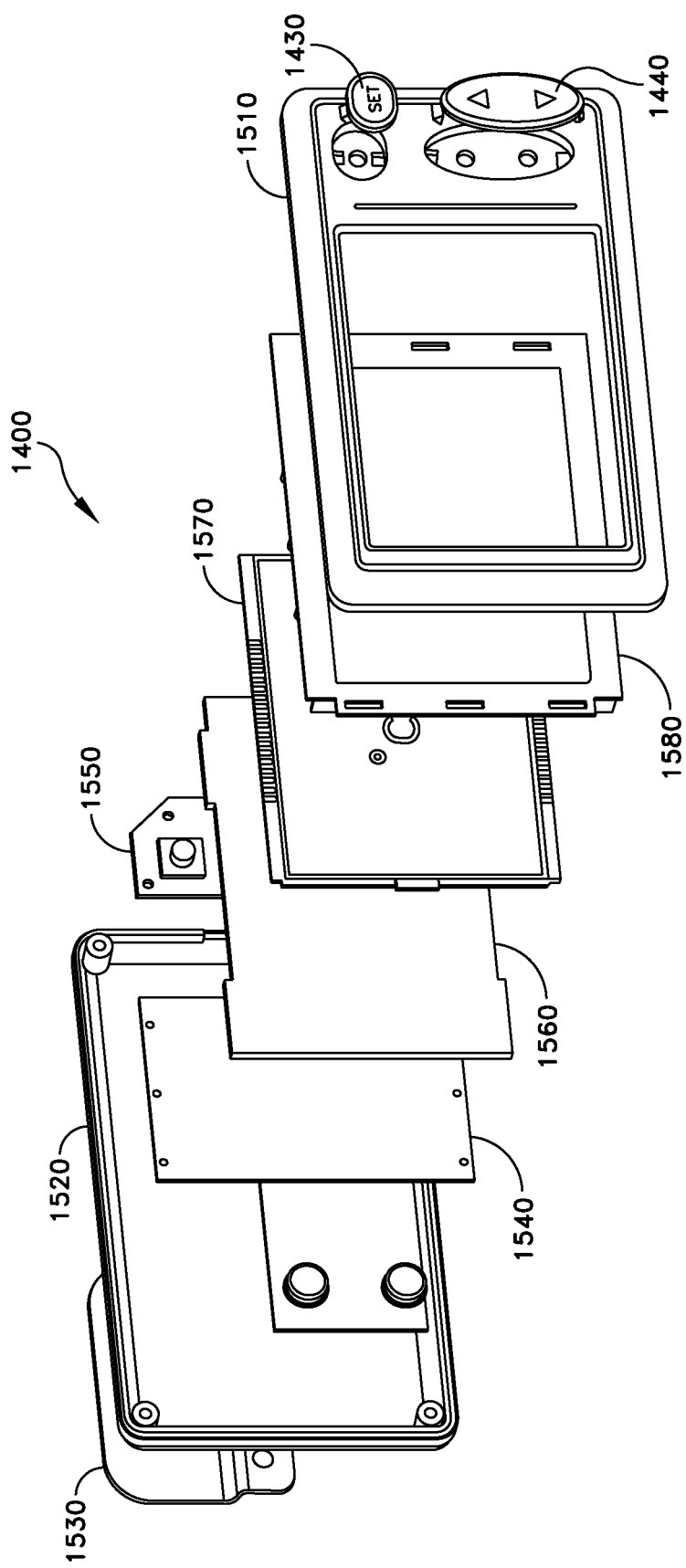
FIG. 15 is an exploded view of the remote display unit of FIG. 14.

Referring now to FIG. 15, an exploded view of the remote display unit 1400 is illustrated. Housing 1410 (of FIG. 14) includes a top cover 1510 and a bottom cover 1520. In one configuration, remote display unit 1400 is configured to be mounted on a wall. In an exemplary embodiment, a bracket or holder 1530 is secured to bottom cover 1520, thereby rendering remote display unit 1400 configured to be mounted on a wall. Bracket 1530 is adapted to be secured to a wall, for example, to mount display unit 1400 to the wall. Other mechanisms, such as screw-eyes and releasable mounts, may also be used to mount display unit 1400 to a wall. Housing 1410 (of FIG. 14) houses a controller PCB 1540, a button PCB 1550, a backlight plate 1560, an LCD panel 1570, and a lens 1580. Controller PCB 1540 may include components such as a processor (e.g., processor 1310 of FIG. 13), a memory (e.g., memory 1320 of FIG. 13), an RF antenna (e.g., RF antenna 1380 of FIG. 13) and associated RF transmitting and receiving circuit elements. Button PCB 1550 is in electrical and/or physical communication with buttons 1430, 1440 and controller PCB 1540. Back light plate 1560 and LCD panel 1570 are in electrical communication with controller PCB 1540. Back light plate 1560, LCD panel 1570 and lens 1580 serve to act as the display 1420 of FIG. 14.

Referring now to FIG. 16, there is illustrated schematically a system or kit 1600 for tire pressure monitoring for a motorcycle 1610, according to an embodiment of the invention. In one configuration, motorcycle 1610 includes a front tire 1620 and a rear tire 1630. System or kit 1600 includes a first tire pressure gauge 1625 configured to be mounted on the valve stem of front tire 1620, a second tire pressure gauge 1635 configured to be mounted on the valve stem of rear tire 1630, and a remote display unit 1400. Tire pressure gauges 1625, 1635 may take the form of any one of pressure gauge 10 (of FIG. 1), pressure gauge 410 (of FIG. 4A), pressure gauge 610 (of FIG. 6), pressure gauge 710 (of FIG. 7), or pressure gauge 810 (of FIG. 8). Remote display unit 1400 has at least one setting mode wherein a user can store preferred tire pressure thresholds for each of tires 1620, 1630 and one registering mode wherein a user can associate a particular tire pressure gauge (e.g., gauge 1625) with a preferred tire (e.g., front tire 1620). Remote display unit 1400 may include components illustrated in block diagram of FIG. 13. In an exemplary embodiment, tire pressure gauges 1625, 1635 are adapted to be in one-way wireless communication with remote display unit 1400, i.e., to output wireless signals indicative of the pressure and the battery status information, which wireless signals may be received by remote display unit 1400. Processor 510 (of FIG. 5) may be configured to determine the strength and/or the charge in battery 560 (of FIG. 5), either absolutely or as a percentage or ratio of total charge, and may be configured to cause RF module 540 (of FIG. 5) to emit a wireless signal including data indicative of the determined battery strength or charge, for example. In another embodiment, tire pressure gauges 1625, 1635 may be adapted to be in two-way wireless communication with remote display unit 1400, i.e., to receive wireless signals from remote display unit 1400, for example, to wake or activate the processor (e.g., processor 510 of FIG. 5).

Figure 17A:
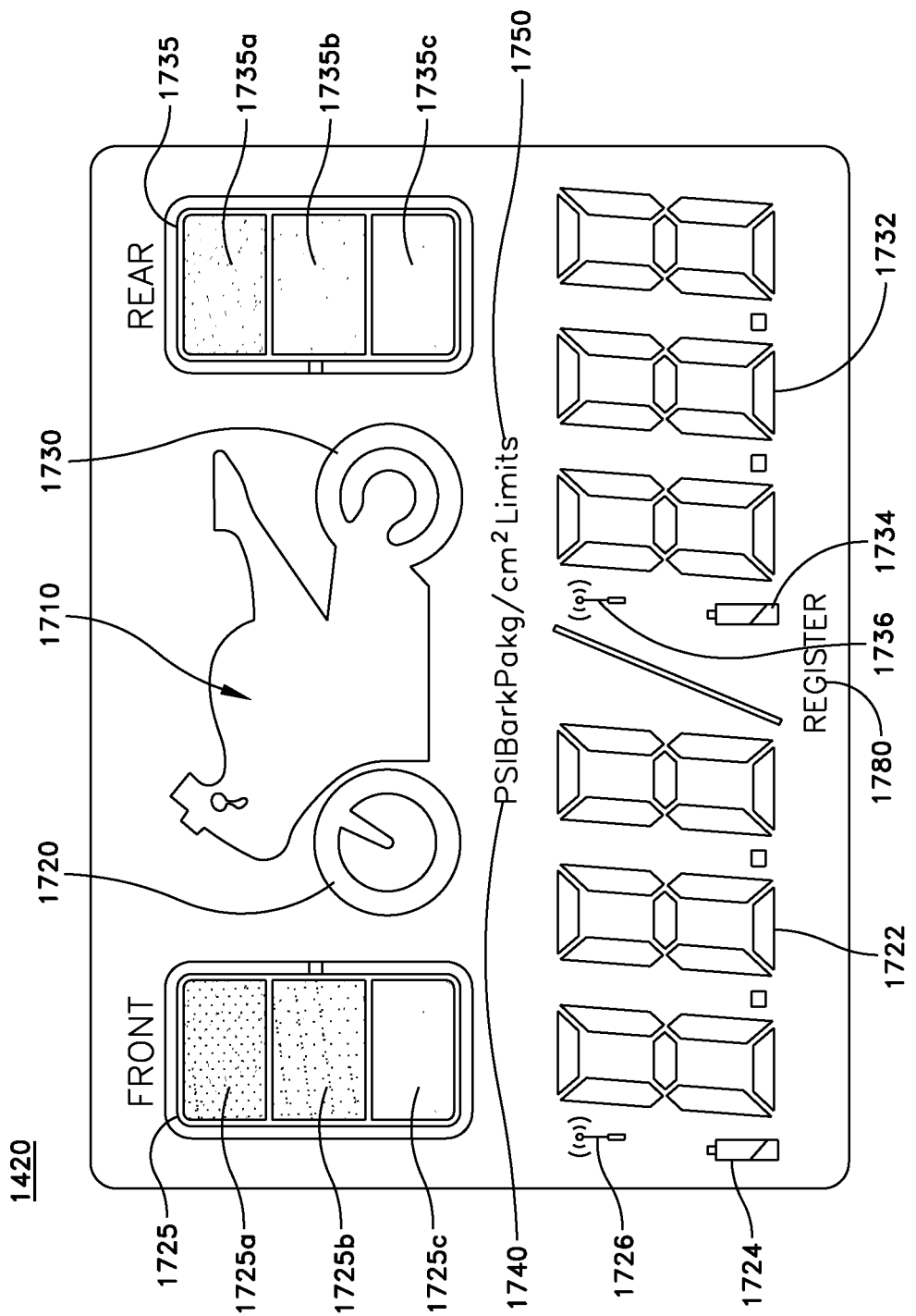
FIG. 17A is a layout of the LCD display of the remote display unit of FIG. 14, according to an embodiment of the invention.

Referring now to FIG. 17A, an exemplary layout of display 1420 is illustrated. Schematic FIG. 1710 represents motorcycle 1610 (of FIG. 16) with elements 1720, 1730 representing front tire 1620 and rear tire 1630 respectively. Display 1420 is configured to display one or more graphical indicators indicative of a tire pressure detected by pressure sensor 480 (of FIG. 5). In an exemplary configuration, the graphical indicators take the form of graphical bars 1725, 1735. Each element 1720, 1730 has an associated graphical bar 1725, 1735 respectively. Each graphical bar 1720, 1730 is divided into three sectors 1725a, 1725b, 1725c and 1735a, 1735b, 1735c respectively. In the illustrated embodiment, each of three sectors 1725a, 1725b, 1725c of bar 1725 and each of three sectors 1735a, 1735b, 1735c of bar 1735 is adapted to illuminate in a different color. For example, sectors 1725a, 1735a are adapted to illuminate in green, sectors 1725b, 1735b are adapted to illuminate in yellow, and sectors 1725c, 1735c are adapted to illuminate in red. It will be appreciated that in other embodiments, bars 1725, 1735 may be divided into more than or fewer than three sectors and that sectors 1725a, 1725b, 1725c, 1735a, 1735b, 1735c may illuminate in colors other than those described above. It will further be appreciated that sectors 1725a, 1725b, 1725c, 1735a, 1735b, 1735c may take the form of a LED in an embodiment of the invention.

A text field 1722 is positioned adjacent to element 1720 and is adapted to display at least a value indicative of the tire pressure for front tire 1620 in the illustrated embodiment. A graphical symbol 1726 is indicative of the strength of RF signal received from tire pressure gauge 1625 (of FIG. 16) associated with front tire 1620 of motorcycle 1610. Similarly, a graphical symbol 1724 is indicative of the battery status (e.g. of battery 560 (of FIG. 5), as determined by processor 510 (of FIG. 5) and communicated by RF module 540 (of FIG. 5) to remote display unit 1400) of tire pressure gauge 1625 (of FIG. 16) associated with front tire 1620 of motorcycle 1610. Likewise, graphical symbol 1736 is indicative of the strength of RF signals received from tire pressure gauge 1635 (of FIG. 16) associated with rear tire 1630 and graphical symbol 1734 is indicative of the battery status (e.g., of battery 560 (of FIG. 5)) of tire pressure gauge 1635 (of FIG. 16) associated with rear tire 1630 of motorcycle 1610.

In the illustrated embodiment, a text field 1740 is adapted to display various units of pressure. By way of non-limiting example only, text field 1740 is adapted to display one of "PSI," "Bar," "kPa," and "kg/cm$^2$," depending on the selection by a user. Display 1420 further includes first and second text fields 1750, 1760. In the illustrated embodiment, first text field 1750 is adapted to display "Limits" when the user has selected a setting mode to set tire pressure limits. Similarly, second text field 1760 is adapted to display "Register" when display unit 1400 is in the process of registering tire pressure gauges 1625, 1635 associated with respective tires 1620, 1630 of motorcycle 1610. In other embodiments, text fields 1750, 1760 may be adapted to display other messages for the user.

Figure 17B:
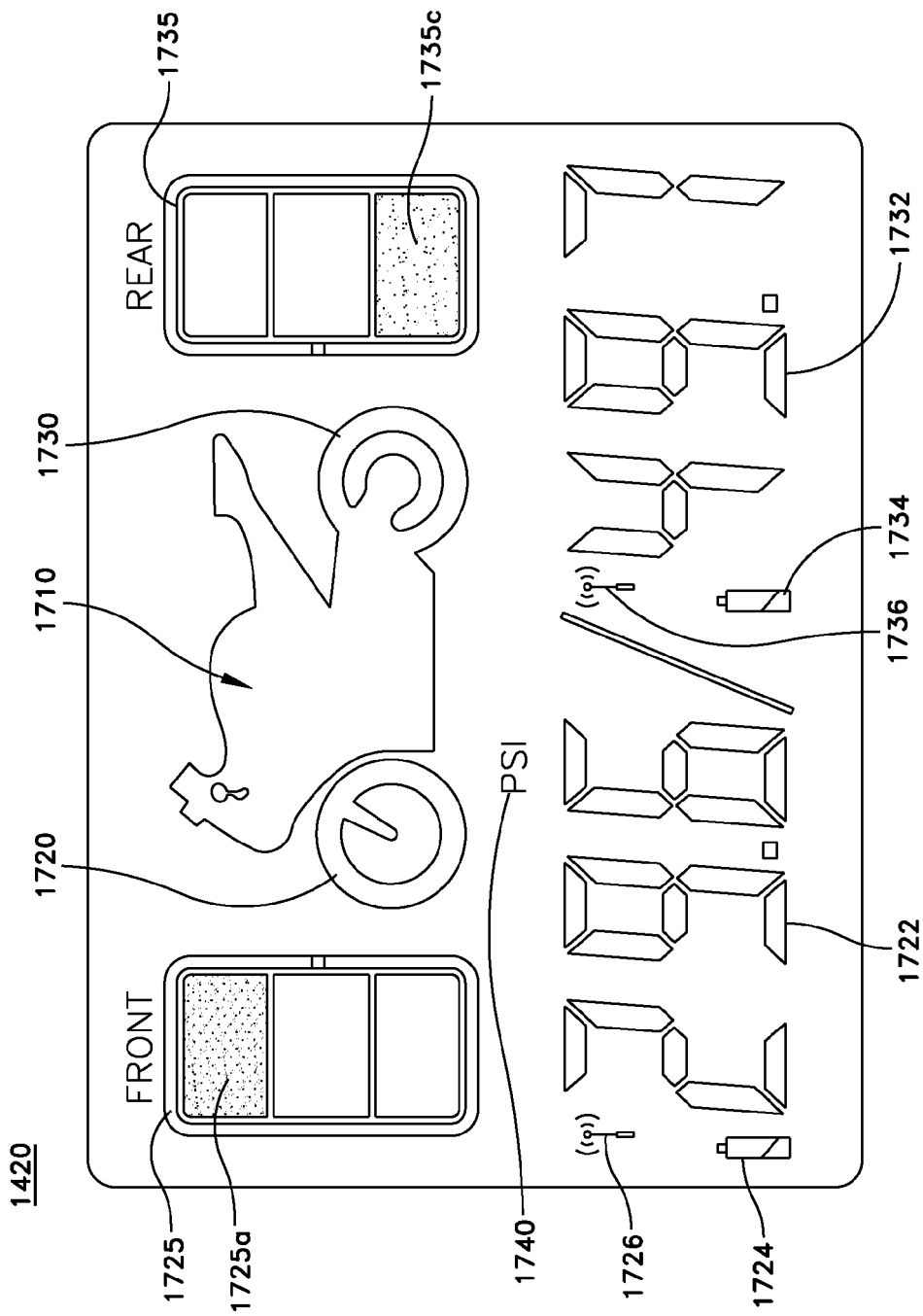
FIG. 17B is an exemplary view of LCD display of the remote control unit of FIG. 17A showing exemplary values, according to an embodiment of the invention.

Referring now to FIG. 17B, an exemplary display 1420 is illustrated wherein tire pressure thresholds or target tire pressures have been pre-set by the user, as will be described herein, and display unit 1400 displays the values of tire pressure measurements detected by, and received from, tire pressure gauges 1625, 1635 (of FIG. 16) associated with respective tires 1620, 1630 of motorcycle 1610. Text field 1740 indicates that the displayed pressure measurements are in PSI units. Text field 1722 indicates that the detected tire pressure of front tire 1620 is 29.6 PSI and text field 1732 indicates that the detected tire pressure of rear tire 1630 is 49.7 PSI. In the exemplary embodiment, the pressure threshold for both tires 1620, 1630 is 30 PSI, for illustrative purpose only. It will be appreciated that a user is free to set different pressure threshold values for different tires. Graphical symbols 1726, 1736 indicate that both tire pressure gauges 1625, 1635 (of FIG. 16) associated with respective tires 1620, 1630 are in RF communication with display unit 1400. Similarly, graphical symbols 1724, 1734 indicate that the batteries (e.g., batteries 560 (of FIG. 5)) of both tire pressure gauges 1625, 1635 are at least partially charged. In the illustrated embodiment, sector 1725a is illuminated (by way of non-limiting example only, in green) to indicate that the measured pressure value for the respective front tire 1620 is equal to or within acceptable range of pre-set pressure threshold. Likewise, sector 1735c is illuminated (by way of non-limiting example only, in red) to indicate that the detected tire pressure of tire 1630 is excessively beyond the pre-set threshold, i.e., in the instant case, tire 1630 is over-inflated.

Figures 18A, 18B:
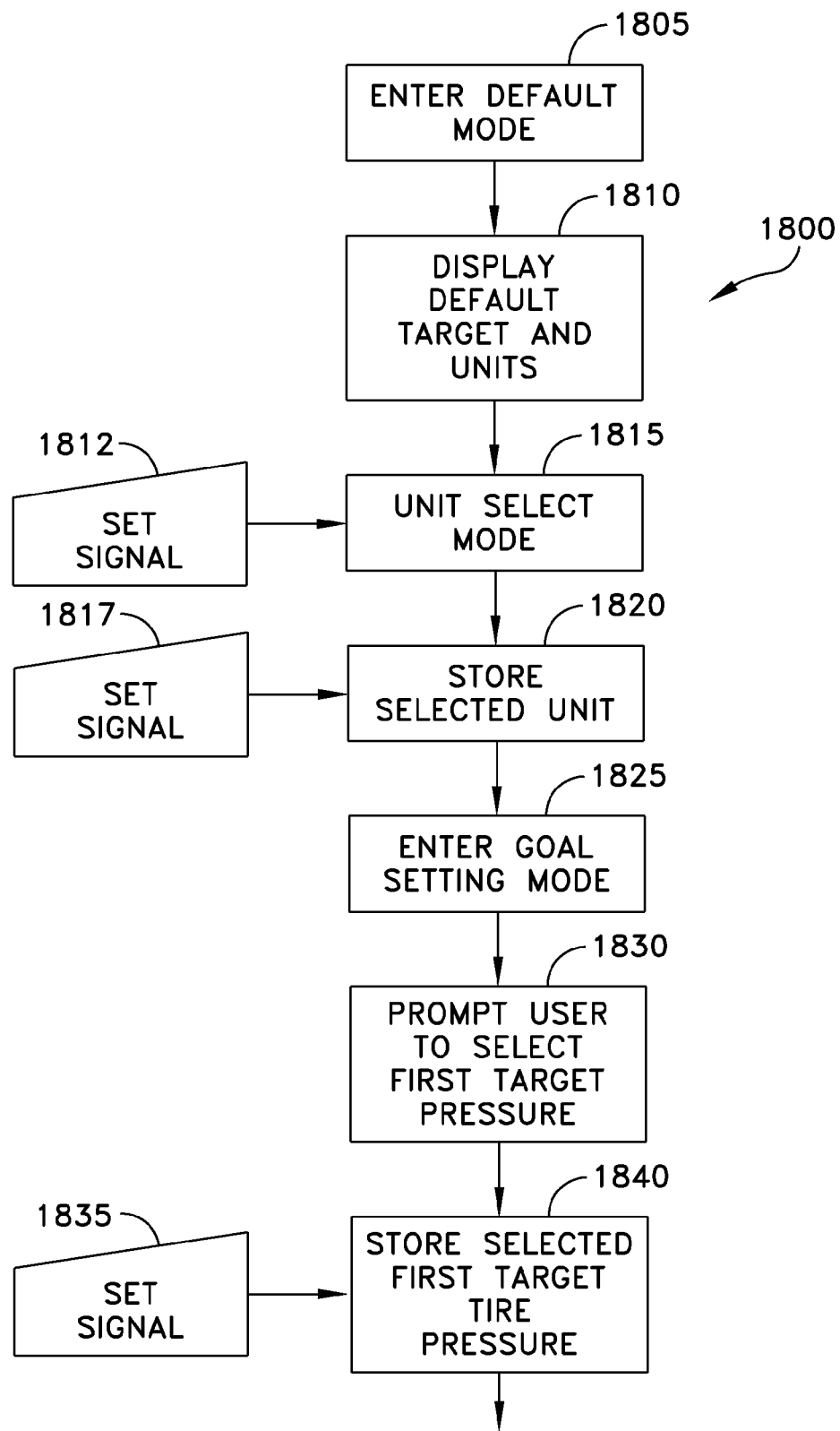
FIGS. 18A and 18B illustrate a process flow for preparing a system of FIG. 16 for use, according to an embodiment of the invention.
Figure 18B:
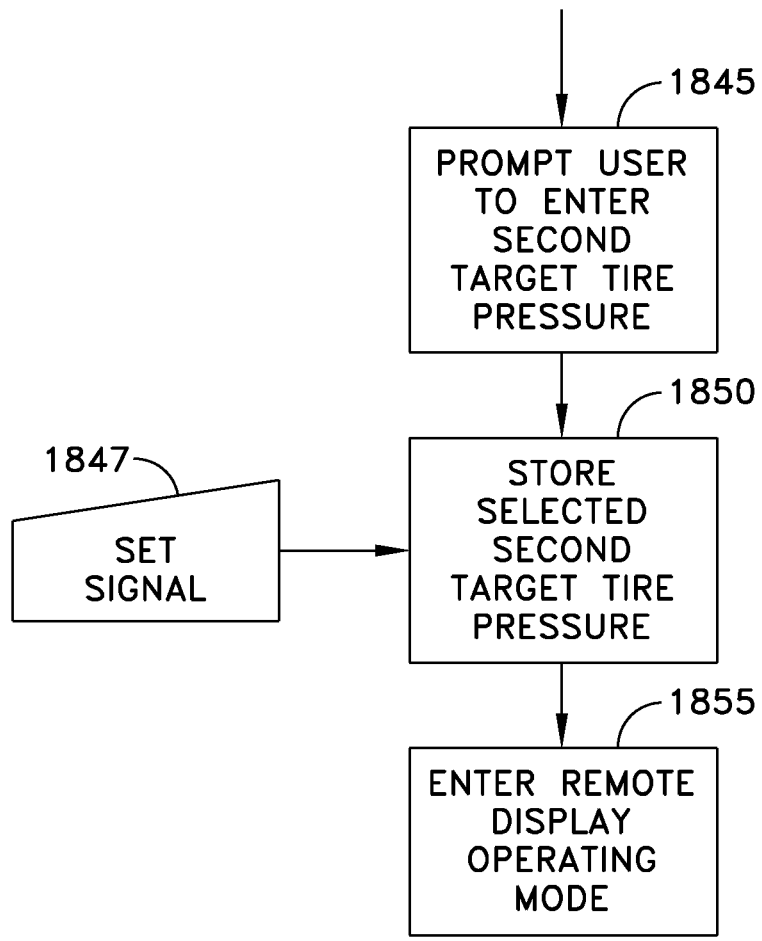

Referring now to FIGS. 18A and 18B, there is shown a block diagrammatic representation of a process 1800, according to an aspect of the present invention, and being suitable for use with display unit 1400 (of FIG. 14). In an initial step, indicated by block 1805, upon initially powering up of display unit 1400 (of FIG. 14), display unit 1400 enters a default initial display mode. In the default mode, processor 1310 (of FIG. 13) accesses, such as from memory 1320 (of FIG. 13), a stored default target pressure value, and a stored default pressure unit, and causes those target value and pressure unit to be displayed, as indicated by block 1810.

In response to a SET signal, as indicated by block 1812, display unit 1400 (of FIG. 14) enters a pressure unit select mode, as indicated by block 1815. In the pressure unit select mode, a pressure unit will blink to prompt the user to select a pressure unit. For example, initially, pressure unit "PSI" may blink. In response to the user pressing the up and down button 1440 (of FIG. 14), the pressure unit that is blinking will change to another pressure unit. In response to a further SET signal, the pressure unit for remote display unit 1400 (of FIG. 14), as displayed, will be selected and stored in memory, as indicated by blocks 1817 and 1820, and remote display unit 1400 (of FIG. 14) will enter a goal setting mode, as indicated by block 1825.

In the goal setting mode, the user is prompted to enter a first target tire pressure, as indicated by block 1830. The first target tire pressure may be for front tire 1620 (of FIG. 16), for example, as represented by element 1720 (of FIG. 17). The prompting may take the form of causing element 1720 to blink or illuminate. A default target tire pressure is displayed in associated text field 1722, and may be incremented up and down in response to pressing of the up and down buttons 1440 (of FIG. 14) by the user. When a desired first target tire pressure is displayed, the user may press the SET button 1430 (of FIG. 14). This will generate a SET signal, indicated by block 1835, to the processor 1310 (of FIG. 13), which will then store, as indicated by block 1840, the then-displayed value as the first target tire pressure in memory 1320 (of FIG. 13).

Referring now to FIG. 18B, the processor may then prompt the user to enter a second target tire pressure, as indicated by block 1845. The second target tire pressure may be for rear tire 1630 (of FIG. 16). The prompting may take the form of causing the element 1730 to blink or illuminate. A default second target tire pressure may be displayed in associated text field 1732. The displayed second target tire pressure may be incremented up and down in response to pressing of the up and down button 1440 (of FIG. 14) by the user. When a desired second target tire pressure is displayed, the user may press the SET button 1430 (of FIG. 14), as indicated by block 1847. In response, processor 1310 (of FIG. 13) will store the then-displayed second target tire pressure in memory 1320 (of FIG. 13), as indicated by block 1850. Remote display unit 1400 (of FIG. 14) may then enter the remote display operating mode.

In an exemplary embodiment of system or kit 1600, two tire pressure gauges 1625, 1635 (of FIG. 16) are pre-registered with remote display unit 1400. Thus, according to an embodiment of the invention, a tire pressure monitoring kit for a motorcycle includes two tire pressure gauges 1625, 1635 (of FIG. 16) each of which is configured to be mounted on a valve stem of a tire of the motorcycle, and an externally powerable remote display unit 1400. For example, first tire pressure gauge 1625 (of FIG. 16) is labeled "F" to indicate front, thereby configured to be mounted on the front tire of a motorcycle. Likewise, second tire pressure gauge 1635 (of FIG. 16) is labeled "R" to indicate rear, thereby configured to be mounted on the rear tire of the motorcycle. The user mounts these two tire pressure gauges 1625, 1635 (of FIG. 16) respectively on the valve stems of front tire 1620 (of FIG. 16) and rear tire 1630 (of FIG. 16) of motorcycle 1610 (of FIG. 16). Both tire pressure gauges 1625, 1635 (of FIG. 16) are adapted to in wireless communication with remote display device 1400 (of FIG. 16) via first radio frequency module 540 (of FIG. 5) of pressure gauges 1625, 1635 (of FIG. 16) and second radio frequency module 1380 (of FIG. 13) of remote display unit 1400 (of FIG. 14). In an embodiment, pressure gauges 1625, 1635 (of FIG. 16) may be configured to be in one-way wireless communication with display unit 1400 (of FIG. 16), i.e. pressure gauges 1625, 1635 (of FIG. 16) may only transmit wireless signals, which may be received by remote display unit 1400 (of FIG. 16). In other embodiments, pressure gauges 1625, 1635 (of FIG. 16) may be configured to transmit wireless signals to, and receive wireless signals from, remote display unit 1400 (of FIG. 16).

In other embodiments, the tire pressure monitoring kit may include two tire pressure gauges 1625, 1635 (of FIG. 16), each of which is configured to be mounted on a valve stem of a motorcycle tire, without being designated for a particular tire. In such case, the user may mount one of tire pressure gauges 1625, 1635 on a front tire of the motorcycle and the other on a rear tire of the motorcycle. A manual registration process may then be used to register each of tire pressure gauges 1625, 1635 with remote display unit 1400 as being associated with its respective motorcycle tire, as described below.

A process flow for manual registration of valve cap mounted tire pressure gauges 1625, 1635 and associated transmitters with the display unit 1400 will be described with reference to FIGS. 14 and 19. In an exemplary embodiment, the user removes all batteries (e.g., 655 (of FIG. 6)) of both tire pressure gauges 1625, 1635. The user then powers remote display unit 1400 using, by way of example only, the AC adaptor or a 12 volt cigar lighter power receptacle of motorcycle 1610 (of FIG. 16). The user causes a registration signal, as indicated by block 1905 to be sent to processor 1310 (of FIG. 13), such as by pressing a registration key, which may be recessed in any suitable location, so that it is not inadvertently pressed during normal use. In response, display unit 1400 enters the registration mode, as indicated by block 1910.

Display unit 1400 prompts the user to activate a wireless transmission from the valve-stem mounted tire pressure gauge (e.g., gauge 1625 of FIG. 16) mounted on a particular tire (e.g., front tire 1620 of FIG. 16), as indicated by block 1915, which transmission includes at least an identifier indicative of tire pressure gauge identification information in the form of. The prompting may include blinking or illuminating element 1720 (of FIG. 17) associated with the particular tire (e.g., front tire 1620 of FIG. 16). The identification information may be an alphanumeric sequence, which sequence is different at least for each tire pressure gauge on a particular vehicle, and is stored in a memory of the valve-stem mounted tire pressure gauge as associated with an identifier associated with the particular tire. The user then installs battery (e.g., battery 655 (of FIG. 6)) in first tire pressure gauge 1625 (of FIG. 16) which causes first tire pressure gauge 1625 (of FIG. 16) to emit a wireless signal via RF antenna (e.g., RF antenna 350 of FIG. 3). This wireless signal includes an identifier for gauge 1625.

When the identification is received, as indicated by block 1920, processor 1310 (of FIG. 13) stores the identification and an association between the gauge identifier and the identifier for the particular tire, as indicated by block 1925. When processor 1310 (of FIG. 13) has completed storing this information, processor 1310 may cause a success signal to be displayed, as indicated by block 1930. For example, the success signal may include blinking or illuminating the element associated with the particular tire a selected number of times in a color different from the color of the prompting signal. For example, the success signal may include blinking the associated element in green three times. In another configuration, the display may display a pressure "0.0" in associated text field and activate the element representative of the other tire.

If both tires 1620, 1630 do not have an associated identification stored in memory, then, as indicated by block 1935, processor 1310 (of FIG. 11) may then prompt the user to cause other one of gauges 1625, 1635 to emit a wireless identification signal. The user then installs batteries (e.g., battery 655 (of FIG. 6)) in respective pressure gauge 1635 (of FIG. 16). The process is then repeated until an identification is associated with each tire 1620, 1630 in memory 1320 (of FIG. 13), and then the registration process ends, as indicated by block 1940.

Figure 20:
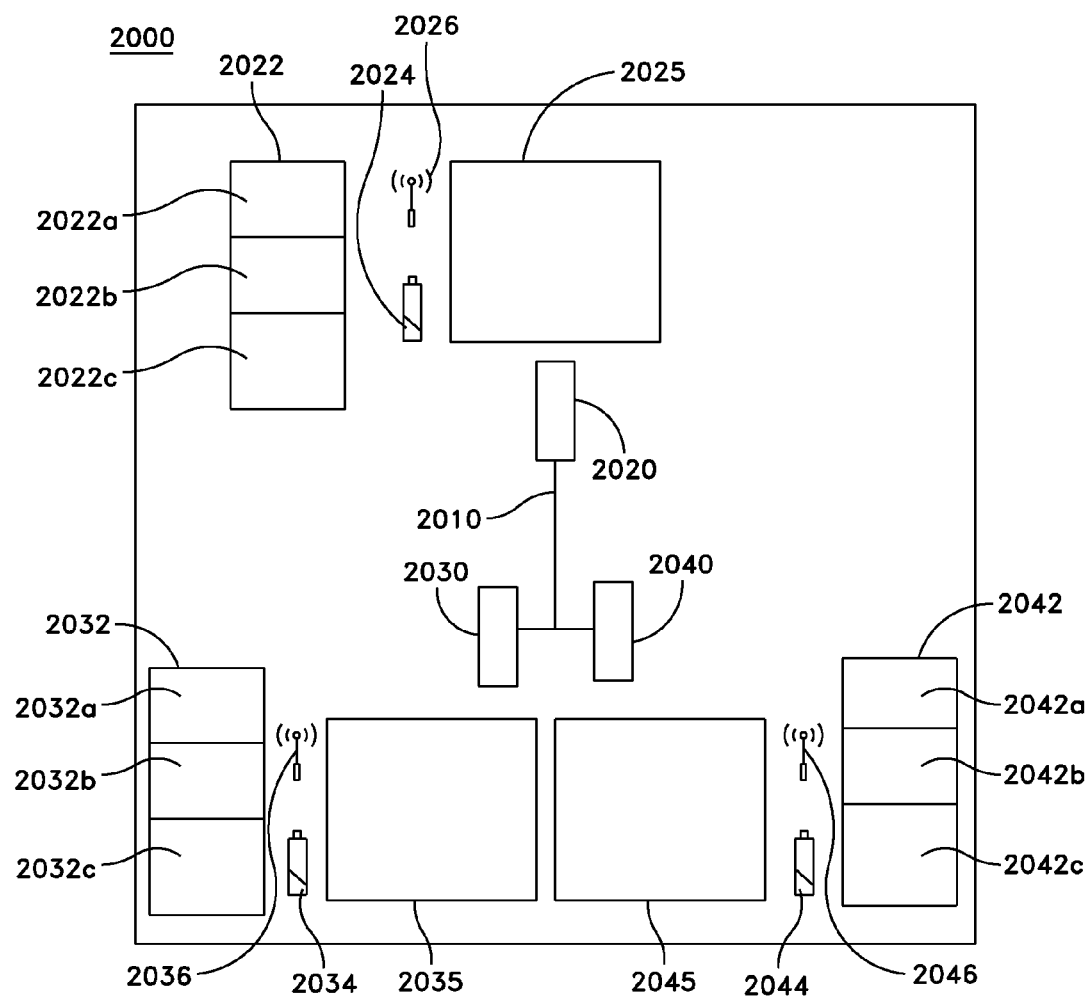
FIG. 20 is a layout of the LCD display of the remote display unit of FIG. 14, according to another embodiment of the invention.

According to an embodiment of the invention, the tire pressure monitoring system or kit includes three tire pressure gauges configured to be mounted on the valve stems of three wheels associated with a three-wheeled motorcycle and a display unit adapted to be in wireless communication with the three pressure gauges and to display the tire pressures for three wheels associated with a motorcycle. It will be appreciated that this embodiment may be appropriately modified for a motorcycle with a spare tire or a motorcycle with a one-wheel trailer without departing from the scope of the invention. An exemplary partial layout 2000 of display 1420 (of FIG. 14) is illustrated in FIG. 20. Layout 2000 includes a stick diagram 2010 representing a three-wheeled motorcycle having three wheels 2020, 2030, 2040. Each wheel 2020, 2030, 2040 has an associated textbox 2025, 2035, 2045 and an associated graphical bar 2022, 2032, 2042 respectively. Graphical symbols 2026, 2036, 2046 are indicative of the strength of RF signals received from a tire pressure gauge (e.g., gauge 10 (of FIG. 1)) associated with each of respective wheels 2020, 2030, 2040 of motorcycle 2010. Similarly, graphical symbols 2024, 2034, 2044 are indicative of the battery status of the batteries (e.g., battery 860 (of FIG. 8)) of the tire pressure gauges (e.g., gauge 10 (of FIG. 1)) associated with the respective wheels 2020, 2030, 2040 of motorcycle 2010.

Figure 21:
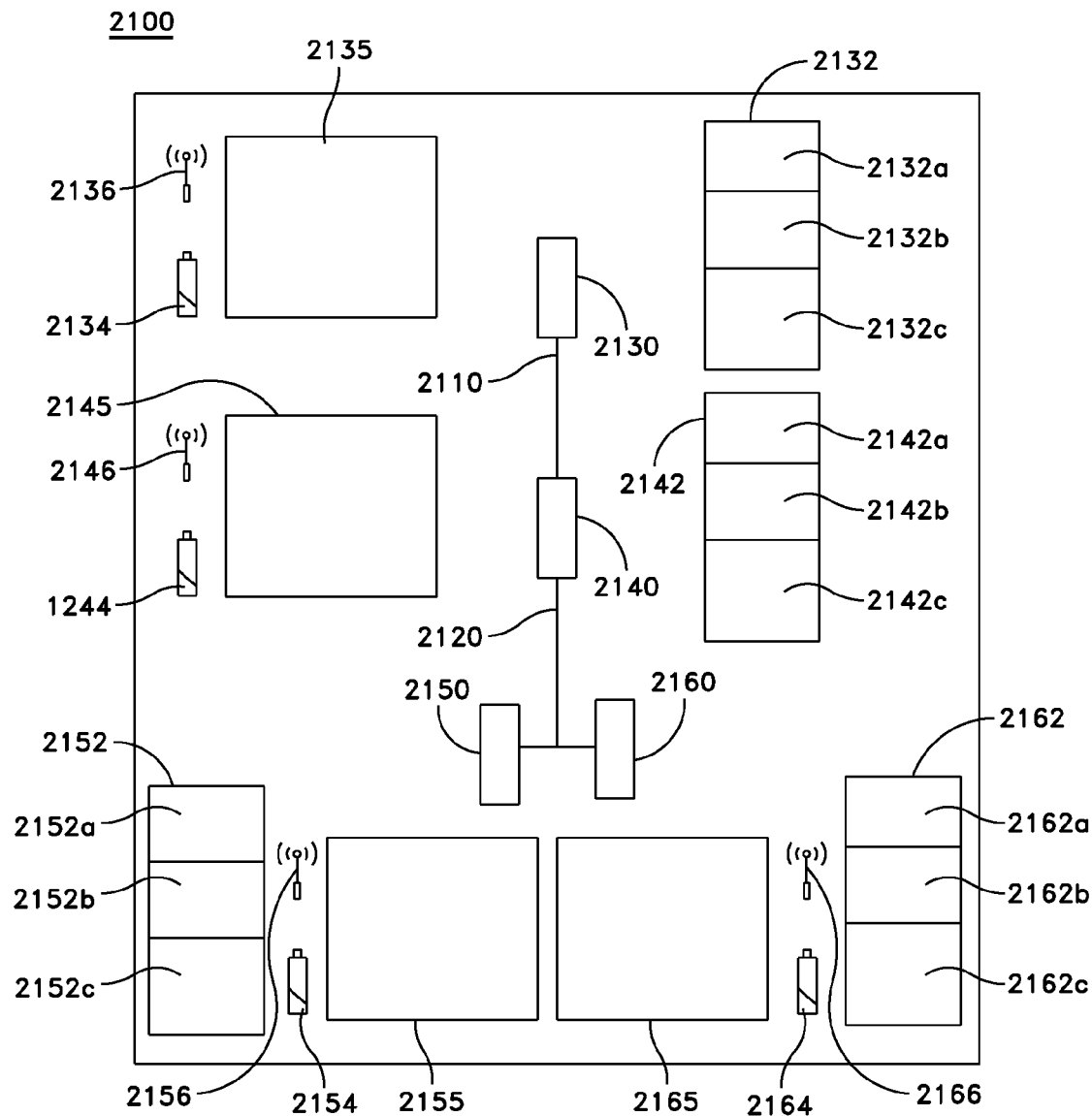
FIG. 21 is a layout of the LCD display of the remote display unit of FIG. 14, according to yet another embodiment of the invention.

According to yet another embodiment of the invention, the tire pressure monitoring system or kit includes four tire pressure gauges configured to be mounted on the valve stems of four wheels associated with a motorcycle and with a two-wheeled trailer, and a display unit adapted to be in wireless communication with the four pressure gauges and to display the tire pressures for the two motorcycle wheels and the two trailer wheels associated with the motorcycle. An exemplary partial layout 2100 of display 1420 (of FIG. 14) is illustrated in FIG. 21. Layout 2100 includes a stick diagram 2110 representing a two-wheeled motorcycle having two wheels 2130, 2140 and a stick diagram 2120 representing a two-wheeled trailer having two wheels 2150, 2160. Each wheel 2130, 2140, 2150, 2160 has an associated text field 2135, 2145, 2155, 2165 and an associated graphical bar 2132, 2142, 2152, 2162 respectively. Graphical symbols 2136, 2146, 2156, 2166 are indicative of the strength of RF signals received from a tire pressure gauge (e.g., gauge 10 (of FIG. 1)) associated with respective wheels 2130, 2140 of the motorcycle and respective wheels 2150, 2160 of the trailer. Similarly, graphical symbols 2134, 2144, 2154, 2164 are indicative of the battery status of the batteries (e.g., battery 860 (of FIG. 8)) of the tire pressure gauges (e.g., gauge 10 (of FIG. 1)) associated with the respective wheels 2130, 2140 of the motorcycle and respective wheels 2150, 2160 of the trailer.

Figure 19:
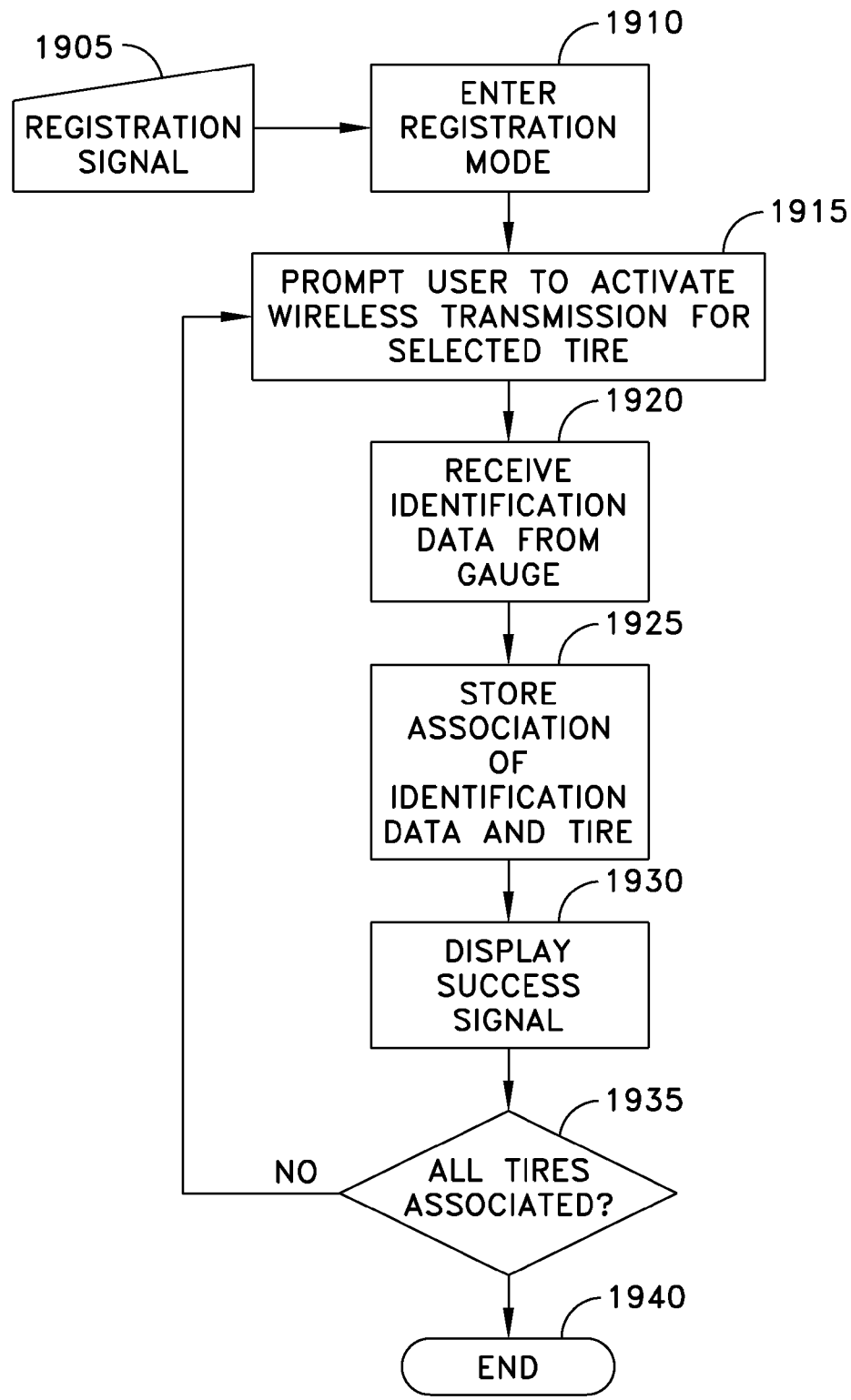
FIG. 19 is a process flow for registration of valve cap mounted tire pressure gauges with a remote display unit, according to an embodiment of the invention.

It will be understood that the processes depicted in FIGS. 18A-18B and 19 may be appropriately modified for use with the systems depicted in FIGS. 19 and 20 and, therefore, are not described in detail for the sake of brevity.

Figure 22:
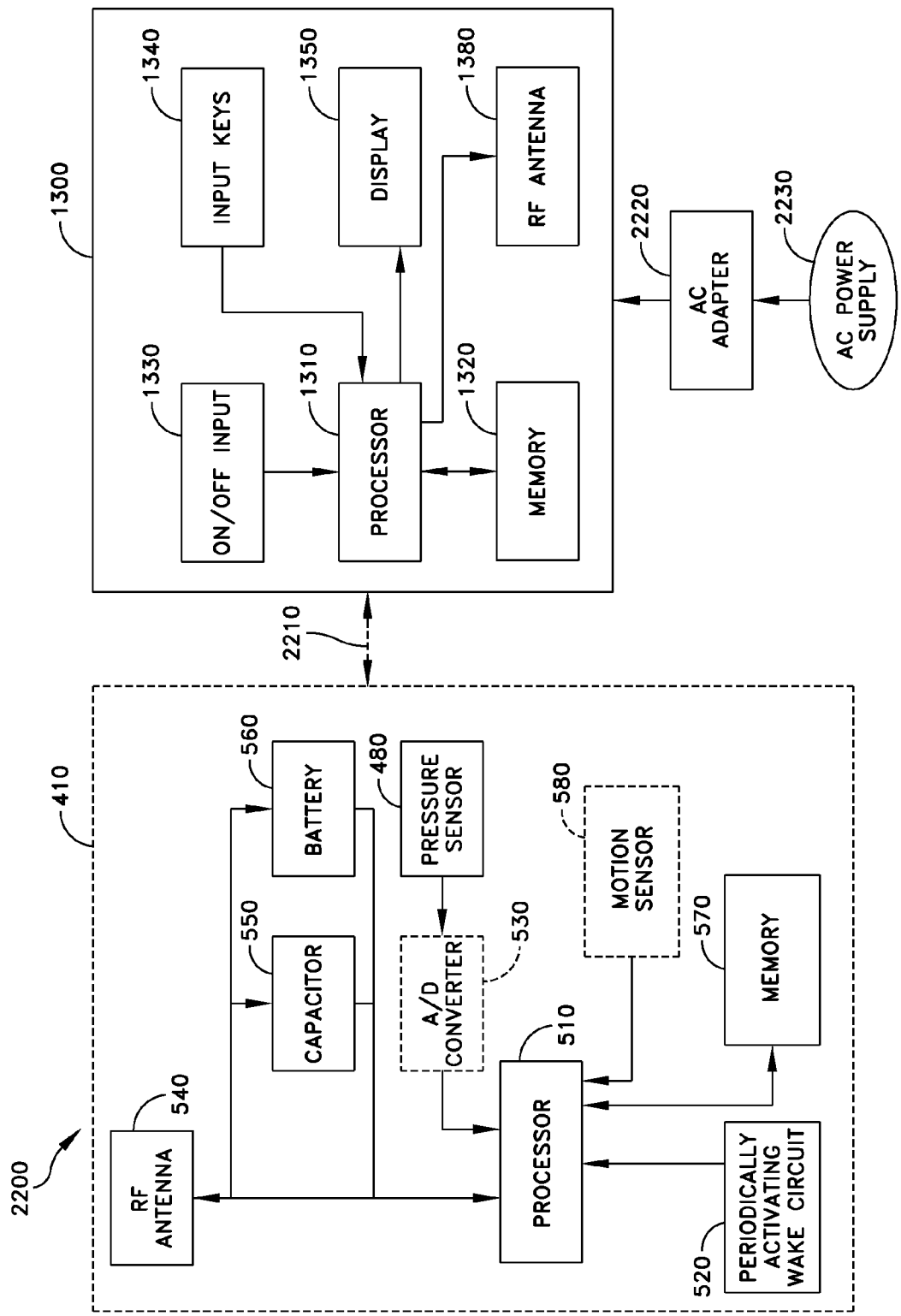
FIG. 22 is a schematic representation of a tire pressure monitoring system, according to an embodiment of the invention.

Referring now to FIG. 22, a schematic diagram of a tire pressure monitoring system 2200 is illustrated, according to an embodiment of the invention. System 2200 includes a valve-stem mounted tire pressure gauge 410 and an externally powerable remote display unit 1300. In the illustrated embodiment, tire pressure gauge 410 includes a processor 510, a periodically activating wake circuit 520, a memory 570 accessible to processor 510, a pressure sensor 480, an RF antenna or module 540, an optional A/D converter 530 and an optional motion sensor 580 in a housing. Tire pressure gauge 410 is described in further detail above with reference to FIG. 5. Remote display unit 1400 includes a processor 1310, a memory 1320 accessible to processor 1310, an RF module or antenna 1380, a display 1350, input keys 1340 and an on/off input 1330 in a housing. Remote display unit 1400 is described in further detail above with reference to FIG. 13. Tire pressure gauge 410 and remote display unit 1300 are configured to be in wireless communication as depicted by broken line 2210. In particular, RF antenna or module 540 of pressure gauge 410 and RF antenna or module 1380 of remote display unit 1300 are configured to be in wireless communication with each other. In the illustrated embodiment, externally powerable remote display unit 1300 is powered by an AC power supply 2230 through AC adapter 2220.

Figure 23:
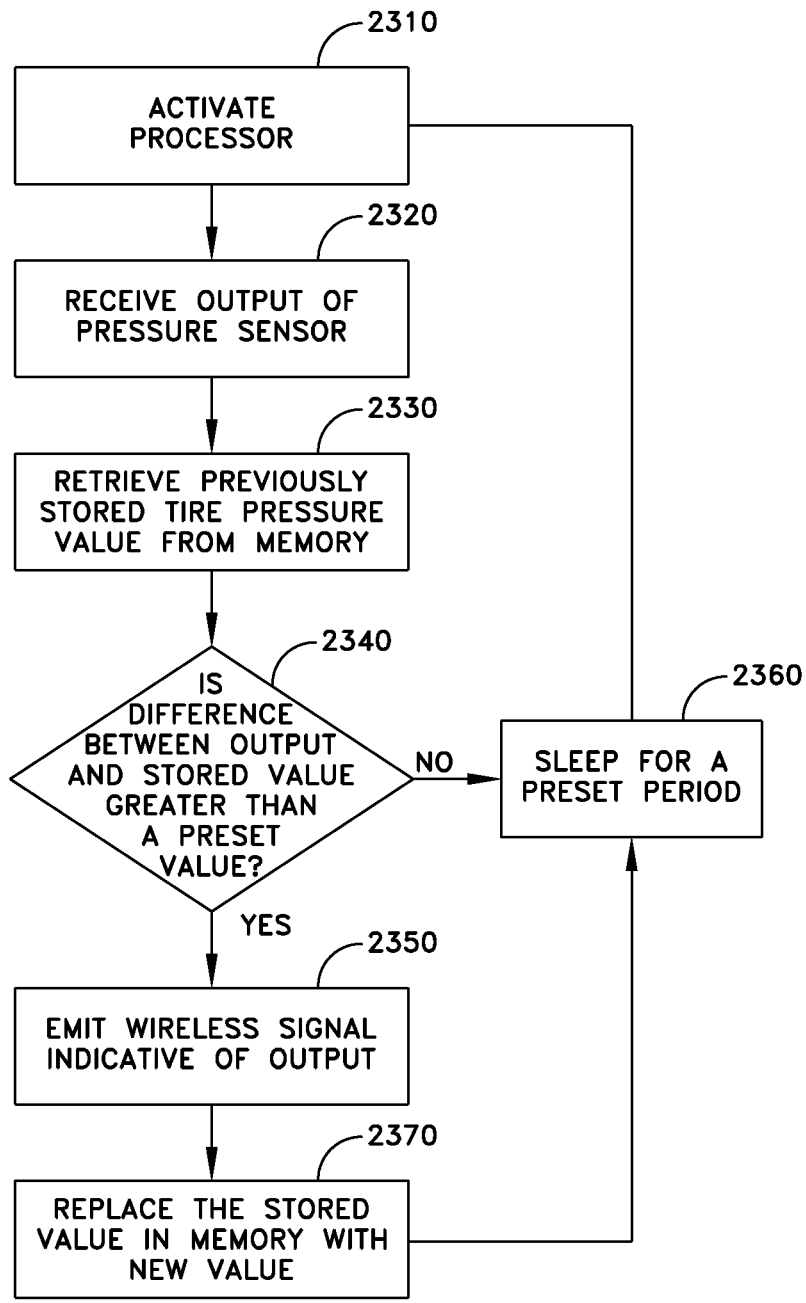
FIG. 23 is a process flow diagram of a process of transmitting a wireless signal indicative of a tire pressure detected by a pressure sensor, according to an embodiment of the invention.

Now referring to FIG. 23, a process flow for transmission of a wireless signal from the pressure gauge 410 (of FIG. 22) is illustrated. At block 2310, processor 510 (of FIG. 22) is activated by wake circuit 520 (of FIG. 22). At block 2320, processor 510 (of FIG. 22) receives an output of pressure sensor 480 (of FIG. 22). At block 2330, processor 510 (of FIG. 22) retrieves a previously stored tire pressure value from memory 570 (of FIG. 22). At block 2340, processor 510 (of FIG. 22) compares the previously stored tire pressure value with the output of pressure sensor 480 (of FIG. 22). If the difference between the output of pressure sensor 480 (of FIG. 22) and the previously stored tire pressure value is less than a predetermined value, then processor 510 (of FIG. 22) returns to an inactive or sleep state, as indicated by block 2360. Processor 510 (of FIG. 22) remains in an inactive state for a preset period of time; at the end of the preset period of time, wake circuit 520 (of FIG. 22) sends a wake signal to processor 510 (of FIG. 22). If the difference is more than the predetermined value, then processor 510 (of FIG. 22) causes RF module or antenna 540 (of FIG. 22) to emit a wireless signal indicative of the output of pressure sensor 480 (of FIG. 22) at block 2350. Processor 510 (of FIG. 22) replaces the previously stored value in memory 570 (of FIG. 22) with the output of pressure sensor 480 (of FIG. 22), as indicated at block 2370, and then sleeps for a predetermined period of time, at block 2360, until activated again by wake circuit 520 (of FIG. 22).

The valve cap mounted tire pressure gauges may be similar to those depicted in FIG. 9 of commonly owned U.S. patent application Ser. No. 11/589,329, filed Oct. 27, 2006, now U.S. Pat. No. 7,667,583, which application is incorporated by reference in its entirety. Those tire pressure gauges include as a power source a battery adapted to be removed and replaced easily. In particular, such a tire pressure gauge includes a battery compartment having a lid which may be removed and replaced readily, and particularly by rotating. The lid is generally a solid cylinder, and has a latch, which mates with a protrusion. By placing a flat object, such as a coin or screwdriver blade, into a slot provided in the lid, the user may turn the lid sufficiently to disengage the latch from the protrusion, and thereby remove the lid and remove and replace the battery. An O-ring may be provided to prevent moisture from entering the interior of battery compartment. The valve-stem mounted tire pressure gauges include an RF emitter.

It will be appreciated that each of the ports for coupling to and mounting to a valve stem of a vehicle tire may be adapted to mount on a valve stem by virtue of having interior threads which permits them to be screwed or threaded onto a valve stem. It will be appreciated that alternative structures may be included in the port for providing that the port is adapted to mount on a valve stem. The ports for coupling to and mounting on a valve stem may be adapted to couple to and mount on a valve stem with no modification to the valve stem.

Referring back to FIG. 16, the operation of the tire pressure monitoring system for a motorcycle according to an embodiment of the invention will now be described. A remote display unit 1400 may be located in a garage, for example, where the motorcycle is parked. In an exemplary embodiment, the unit 1400 may be mounted on a wall (for example, via bracket 1530 of FIG. 15). In one configuration, remote unit 1400 is powered through an AC adaptor, thereby dispensing with the need to monitor the battery status. First and second valve-stem mounted tire pressure gauges 1625, 1635 are mounted on the valve stems of the front and rear tires 1620, 1630 of motorcycle 1610 and accordingly registered with remote display unit 1400.

The pressures of the front and the rear tires are measured by the respective pressure gauges 1625, 1635 periodically, for example, every thirty (30) seconds. It will be understood that the period between measurements may be smaller than or larger than 30 seconds. The processor (e.g., processor 310 (of FIG. 3)) of pressure gauge 1625, 1635 compares the recently measured pressure value with the immediately prior measured pressure value stored in the memory (e.g., memory 570 (of FIG. 5)). If the recently measured pressure value differs from the immediately prior measured pressure value by at least a predetermined threshold amount, the pressure gauge processor (e.g., processor 510 (of FIG. 5)) causes the pressure gauge RF antenna (e.g., antenna 350 of FIG. 3) to emit a wireless signal indicative of the latest measured tire pressure value.

Remote display unit 1400 displays the measured tire pressures numerically as well as graphically, as set forth herein, as received from pressure gauges 1625, 1635. Thus, the tire pressures of the motorcycle are monitored on a continuous basis without any user input. When a user enters the garage, a simple glance at remote display unit 1400 is sufficient to relay the tire pressure information for the motorcycle. Remote display unit 1400 also display the status of the battery 560 (of FIG. 5), thereby conveying to the user if and when the batteries (e.g., battery 560 of FIG. 5) in pressure gauges 1625, 1635 need to be replaced. In one configuration, the on/off input (input 1330 of FIG. 13) may be omitted, since the remote display unit is continuously powered through an AC adapter.

Advantages of a device and method in accordance with the invention include permitting the user to determine whether a tire is underpressurized without the need to remove a tire valve stem cap and physically engage a tire pressure gauge with the tire valve stem cap. Some configurations of valve stem mounted tire pressure gauges, include a motion sensor in the valve stem mounted tire pressure gauge to activate the pressure sensor. However, since a motorcycle may be used recreationally or otherwise intermittently used, the motorcycle may be idle and parked for prolonged periods of time without any movement. An advantage of the present system is that the wake circuit permits pressure measurements even in an idle or parked state of the motorcycle, i.e., independent of the operational state of the motorcycle. Thus, the information regarding the tire pressures of the motorcycle is always available regardless of whether the motorcycle engine or any associated accessory such as electrical/electronic devices are actually activated, provided the remote display is supplied sufficient power, for example, from an AC power supply and the batteries of the tire pressure gauges are functional. Since the motorcycle tires are susceptible to pressure losses due to prolonged storage, such a system advantageously provides the tire pressure information to a rider, before the rider operates or attempts to operate the motorcycle. The system provides the tire pressure information without any input from the rider as the externally powerable remote display unit continuously displays the detected tire pressure values in a numerical as well as a graphical format. Thus, a single glance at the remote display unit is sufficient to inform the rider regarding the need, or lack thereof, to inflate the tires before operating the motorcycle, even after a prolonged period of storage. Yet another advantage of the externally powerable display unit is that a user is spared the tasks of monitoring and/or changing the batteries in the display unit.

A further advantage is that a device in accordance with an embodiment of the invention is that such devices may be installed on vehicles with minimal effort and cost associated with installation. A further advantage of a device in accordance with some embodiments of the invention is that the user may provide the recommended tire pressure of the user's own vehicle to the device, thereby avoiding the need to have this pressure pre-stored when the device is manufactured. An advantage of an embodiment having both an active pressure sensor and a reference pressure sensor is that readings will be compensated for variations in temperature, for example, while the gauge remains on the valve stem. Additional advantages of embodiments of the invention will be evident to those of skill in the art.

While the foregoing invention has been described with reference to the above-described embodiment, various modifications and changes can be made without departing from the spirit of the invention. For example, the number of wheels and the associated pressure gauges may be changed without departing from the spirit of the invention. Accordingly, all such modifications and changes are considered to be within the scope of the appended claims.

What is claimed is:

1. A tire pressure monitoring system comprising:
    at least one tire pressure gauge configured to be mounted on a valve-stem of a tire comprising:
        a radio frequency (RF) transmit/receive module for sending and receiving data indicative of a tire pressure wirelessly via a two-way wireless communication;
        a first processor;
        a first memory in communication with said first processor; and
        a pressure sensor configured for detecting a tire pressure of a tire and for transmitting a signal containing a value indicative of the detected tire pressure to said first processor;
        wherein said first processor is configured to store the value indicative of the detected tire pressure in said first memory and to instruct said first RF transmit/receive module to transmit a wireless signal containing data indicative of the tire pressure detected by said pressure sensor; and
        wherein said first processor is configured to instruct said first RF transmit/receive module to transmit a wireless signal only when the value of a tire pressure detected by said pressure sensor differs from a previous tire pressure value stored in said first memory by an amount exceeding a threshold value;
    a remote display unit comprising:
        a second RF transmit/receive module configured for two-way wireless communication with said first RF transmit/receive module;
        a second processor in communication with said second RF transmit/receive module;
        a second memory in communication with said second processor; and
        a display in communication with said second processor and configured to display data indicative of a tire pressure received from said first RF transmit/receive module, said display comprising:
            at least one first graphical element corresponding to a tire, said at least one graphical element configured to display data indicative of a tire pressure of said corresponding tire to a user;
            a second graphical element configured to display a plurality of pressure units for selection by a user, wherein selection of a pressure unit by a user causes said first processor to instruct said at least one first graphical element to display the tire pressure of the corresponding tire in the selected pressure unit; and
            at least one third graphical element corresponding to the tire, said at least one third graphical element comprising a graphical bar configured to render a color display corresponding to a tire pressure status of said corresponding tire to a user, said graphical bar including at least a first portion configured to generate a green display corresponding to the tire pressure status of the corresponding tire being within an acceptable range of a pre-set pressure threshold as determined by said first processor, and a second portion configured to generate a red display corresponding to the tire pressure status of the corresponding tire being outside of the acceptable range of the pre-set pressure threshold as determined by said first processor.

2. The tire pressure monitoring system of claim 1, wherein said at least one tire pressure gauge further comprises:
    a temperature sensor in communication with said first processor, said temperature sensor configured to detect an internal temperature of a tire and transmit a signal indicative of the detected temperature to said first processor,
    wherein said first processor is configured to instruct said first RF transmit/receive module to transmit a wireless signal containing data indicative of the internal tire temperature detected by said temperature sensor.

3. The tire pressure monitoring system of claim 2, wherein said data relating to the tire comprises:
    an identifier indicative of a position or location of the tire;
    a pressure value indicative of the pressure detected by said pressure sensor; and
    a temperature value indicative of the internal temperature detected by said temperature sensor.

4. The tire pressure monitoring system of claim 2, wherein the display is further configured to display data relating to tire pressure and tire temperature, wherein said first graphical element is further configured to display:
- an identifier of said corresponding tire;
- a tire pressure value of a detected tire pressure of said corresponding tire; and
- a tire temperature value of a detected temperature of said corresponding tire.

5. The tire pressure monitoring system of claim 4, wherein said display further comprises:
- a fourth graphical element configured to display a plurality of temperature units for selection by a user, wherein selection of a temperature unit by a user causes said first processor to instruct said at least one first graphical element to display a temperature of the corresponding tire in the selected temperature unit.

6. The tire pressure monitoring system of claim 1, wherein said pressure sensor comprises:
- a first pressure sensing die in fluid communication with said valve-stem of said tire, said first pressures sensing die configured to detect a tire pressure; and
- a second pressure sensing die in fluid communication with an atmosphere outside the tire, said second pressure sensing die configured to detect an ambient pressure outside the tire;

wherein said pressure sensor is configured to transmit a signal to said first processor indicative of the detected tire pressure and the detected ambient pressure.

7. The tire pressure monitoring system of claim 1, wherein said first processor is configured to retrieve data relating to a tire from said second memory and to instruct said first RF transmit/receive module to transmit a wireless signal containing the data relating to the tire.

8. The tire pressure monitoring system of claim 1, wherein said at least one tire pressure gauge further comprises:
- a wake circuit, said wake circuit in communication with said first RF transmit/receive module, said wake circuit responsive to a wireless signal from said remote display device, generates a wake signal which activates said second processor, which responsive to said wake signal receives a signal indicative of a tire pressure detected by said pressure sensor.

9. The tire pressure monitoring system of claim 1, wherein said first graphical element further comprises a graphical representation of a strength and/or charge of a battery in said tire pressure gauge.

\* \* \* \* \*